United States Patent
Downton et al.

(10) Patent No.: US 12,385,386 B1
(45) Date of Patent: Aug. 12, 2025

(54) SYSTEMS AND METHODS FOR ANALYZING TORTUOSITY IN UNDERGROUND WELLBORES

(71) Applicant: Schlumberger Technology Corporation, Sugar Land, TX (US)

(72) Inventors: Geoffrey Charles Downton, Minchinhampton (GB); Ross Lowdon, Bucharest (RO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/735,378

(22) Filed: Jun. 6, 2024

(51) Int. Cl.
| | | |
|---|---|---|
| *E21B 47/022* | (2012.01) | |
| *E21B 47/04* | (2012.01) | |
| *E21B 47/08* | (2012.01) | |
| *G01V 99/00* | (2009.01) | |
| *E21B 47/09* | (2012.01) | |

(52) U.S. Cl.
CPC ............ *E21B 47/022* (2013.01); *E21B 47/08* (2013.01); *G01V 99/00* (2013.01); *E21B 47/04* (2013.01); *E21B 47/09* (2013.01); *E21B 2200/20* (2020.05)

(58) Field of Classification Search
CPC .......... E21B 47/00; E21B 47/08; E21B 47/02; E21B 47/022; E21B 47/04; E21B 2200/20
See application file for complete search history.

(56) References Cited

U.S. PATENT DOCUMENTS

| | | | |
|---|---|---|---|
| 11,555,397 B2* | 1/2023 | Samuel | E21B 47/022 |
| 2017/0306748 A1* | 10/2017 | Marland | E21B 47/007 |
| 2018/0023385 A1* | 1/2018 | Bang | G01V 1/40 |
| | | | 175/45 |

OTHER PUBLICATIONS

Bang et al., Analysis and Quantification of Wellbore Tortuosity, SPE-173103-PA, SPE Prod & Oper 32 (02): 118-127, 2016.
Onyemelem et al., Rod Guide Placement based on high resolution tortuosity analysis of production tubing, SPE-190935-MS, Paper presented at the SPE Artificial Lift Conference and Exhibition—Americas, The Woodlands, Texas, USA, Aug. 2018.
Dangelo et al., Unplanned Tortuosity Index Separating DD Performance from Planned Well Geometry, SPE-194099-MS, Paper presented at the SPE/IADC International Drilling Conference and Exhibition, The Hague, The Netherlands, Mar. 2019.

* cited by examiner

*Primary Examiner* — Tara Schimpf
*Assistant Examiner* — Ursula Lee Norris
(74) *Attorney, Agent, or Firm* — Jeffrey D. Frantz

(57) ABSTRACT

A method of quantifying tortuosity of a wellbore includes receiving survey data for the wellbore indicating an azimuth and an inclination for the wellbore at one or more measurement depths of the wellbore. The method further includes receiving wellbore diameter data for the wellbore indicating the diameter of the wellbore at one or more measurement depths of the wellbore. The method further includes, based on the survey data and the wellbore data and for each measurement depth, selecting a reference diameter and determining a tortuosity length corresponding to a maximum length that a straight tubular having the reference diameter can extend from the measurement depth and down through the wellbore without bending.

19 Claims, 30 Drawing Sheets

SYSTEMS AND METHODS FOR ANALYZING TORTUOSITY IN UNDERGROUND WELLBORES

BACKGROUND

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids, as well as wellbores used to extract geothermal energy, may be formed in earthen formations using earth-boring tools such as drill bits for drilling wellbores and reamers for enlarging the diameters of wellbores.

In many cases, wellbores exhibit tortuosity to varying degrees, or an amount of curvature or deviation from a straight-line path. Tortuosity can be caused by a variety of factors such as the choice of drilling tools, parameters implemented in drilling a wellbore, and rock formation type, among others. Tortuosity can also present a number of consequences for a downhole system, such as influencing the efficiency, safety, and success of drilling operations, as well as affecting the completion and well construction process. Thus, it may be advantageous to characterize, classify, or quantify tortuosity of a wellbore in a way that is meaningful and easy to conceptualize in order to inform decision making regarding a downhole operation.

SUMMARY

In some embodiments, a method of quantifying tortuosity of a wellbore includes receiving survey data for the wellbore, the survey data indicating an azimuth and an inclination for the wellbore at one or more measurement depths of the wellbore. The method includes receiving wellbore diameter data indicating the diameter of the wellbore at the one or more measurement depths of the wellbore. The method includes, based on the survey data and the wellbore diameter data, and for at least one of the one or more measurement depths, selecting a reference diameter, and determining a tortuosity length corresponding to a maximum length that a straight tubular having the reference diameter can extend from the measurement depth and down through the wellbore without bending.

In some embodiments, a method of quantifying tortuosity of a wellbore includes, receiving survey data for the wellbore, the survey data indicating an azimuth and an inclination for the wellbore at one or more measurement depths of the wellbore. The method includes receiving wellbore diameter data indicating the diameter of the wellbore at the one or more measurement depths of the wellbore. The method includes, based on the survey data and the wellbore diameter data, and for at least one of the one or more measurement depths, selecting a reference length, and determining a tortuosity diameter corresponding to a maximum diameter of a straight tubular that will enable the straight tubular to extend the reference length from the measurement depth and down through the wellbore without bending.

In some embodiments, a method of quantifying tortuosity of a wellbore includes, receiving survey data, the survey data including an indication of an azimuth and an inclination for the wellbore at one or more measurement depths of the wellbore. The method includes receiving wellbore shape data, the wellbore shape data including an indication of a shape of a cross-section of the wellbore at the one or more measurement depths of the wellbore. The method includes, based on the survey data and the wellbore shape data, and for at least one of the one or more measurement depths of interest: selecting a reference diameter; determining a contact zone for the cross-section of the wellbore indicating an area through which a centerline of a tubular of the reference diameter may pass without contacting a wellbore wall of the wellbore; and determining a tortuosity length corresponding to a maximum length that a straight line can extend from the measurement depth and down through the wellbore through contact zones of consecutive downhole measurements.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 4-1 through 4-7 are representation of a wellbore including various schematic representations illustrating features of the tortuosity system, according to at least one embodiment of the present disclosure;

FIG. 5 is a graphical representation of a technique for determining a tortuosity length for a measurement depth of a wellbore, according to at least one embodiment of the present disclosure;

FIGS. 6-1 through 6-4 illustrate techniques for determining contact zones and contact topographies for an example cross-section of a wellbore, according to at least one embodiment of the present disclosure;

FIGS. 6-5 through 6-7 illustrate techniques for determining tortuosity metrics for a wellbore based on example contact zones and contact topographies, according to at least one embodiment of the present disclosure;

FIG. 7 illustrates an example plot generated by a report manager, according to at least one embodiment of the present disclosure;

DETAILED DESCRIPTION

Figure 1:
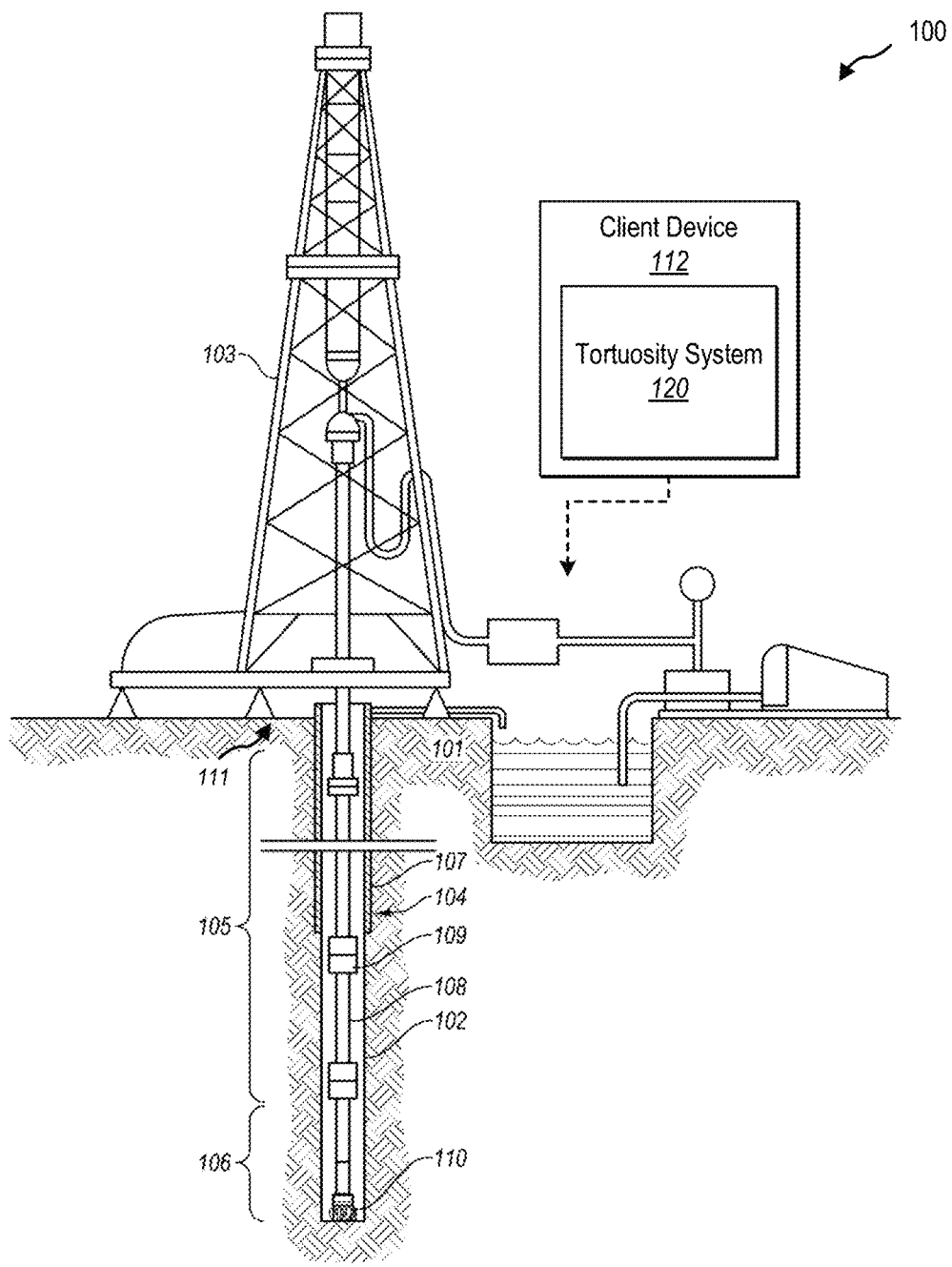
FIG. 1 is an example of a downhole system, according to at least one embodiment of the present disclosure.

This disclosure generally relates to systems and methods for determining tortuosity in underground wellbores. A tortuosity system may receive survey data, including an azimuth and inclination for one or more measurement depths of the wellbore, and may determine one or more tortuosity metrics for one or of characterizing, classifying, or quantifying the tortuosity of the wellbore. For example, the tortuosity system may determine one or more tortuosity lengths for measurement depths of interest of the wellbore. The tortuosity length may be defined as the maximum length that a simulated straight tubular of a given diameter may extend from a certain measurement depth and down the wellbore without bending, or without contacting the wellbore wall. Multiple tortuosity lengths may be determined for multiple diameters of interest for the simulated tubular.

Similarly, the tortuosity system may determine one or more tortuosity diameters for measurement depths of interest. The tortuosity diameter may be defined as the maximum diameter that a simulated tubular of a given length may extend from a certain measurement depth and down the wellbore without bending, or without contacting the wellbore wall. Multiple tortuosity diameters may be determined for multiple lengths of interest for the simulated tubular.

Additionally, the tortuosity system may determine a cumulative tortuosity angle for one or more measurement depths of interest. The cumulative tortuosity angle may be determined by segmenting the wellbore into a plurality of segments based on determining a tortuosity length (e.g., maximum extent of a simulated tubular) for at least one of or every segment extending from the previous segment. For a given measurement depth, the angles between adjacent segments for all previous (e.g., uphole) segments may be determined and summed in order to determine the cumulative tortuosity angle. The cumulative tortuosity angle in this way may be a value that represents the totality of the tortuosity for a wellbore (or section of wellbore) up to a given measurement depth of interest.

The tortuosity system may generate one or more plots representing one or more of the tortuosity metrics for one or more measurement depths of interest. For example, the tortuosity system may generate a plot illustrating the tortuosity lengths for one or more associated reference diameters over a range of measurement depths of interest. In another example, the tortuosity system may generate a plot illustrating the tortuosity diameters for one or more associated reference lengths over a range of measurement depths of interest. In another example, the tortuosity system may generate a plot illustrating the cumulative tortuosity angle associated with one or more reference diameters over a range of measurement depths of interest. In this way, the tortuosity system may determine one or more tortuosity metrics useful for conceptualizing the tortuosity of a wellbore and may present these metrics to a user in a way that is simple, meaningful, and easy to consume.

Additional details will now be provided regarding systems described herein in relation to illustrative figures portraying example implementations. For example, FIG. 1 shows one example of a downhole system 100 for drilling an earth formation 101 to form a wellbore 102. The downhole system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of the drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 further includes additional downhole drilling tools and/or components such as subs, pup joints, etc. The drill pipe 108 provides a hydraulic passage through which drilling fluid is pumped from the surface 111. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110, other downhole drilling tools, or other components. An example BHA 106 may include additional or other downhole drilling tools or components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing.

In general, the downhole system 100 may include other downhole drilling tools, components, and accessories such as special valves (e.g., kelly cocks, blowout preventers, and safety valves). Additional components included in the downhole system 100 may be considered a part of the drilling tool assembly 104, the drill string 105, or a part of the BHA 106, depending on their locations in the downhole system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to the surface 111 or may be allowed to fall downhole. The bit 110 may include one or more cutting elements for degrading the earth formation 101.

The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as one or more of gravity, magnetic north, or true north. In some embodiments, the RSS may maintain an orientation and compute the orientation of a geostable reference relative to the downhole system 100 as one or more components rotates in real time. Using measurements obtained with the geostationary position, the RSS may locate the bit 110, change the course of the bit 110, and direct the directional drilling tools on a projected trajectory. The RSS may steer the bit 110 in accordance with or based on a trajectory for the bit 110. For example, a trajectory may be determined for directing the bit 110 toward one or more subterranean targets such as an oil or gas reservoir, or away from an obstacle such as an earlier well.

The downhole system 100 may include or may be associated with one or more client devices 112 with a tortuosity system 120 implemented thereon (e.g., implemented on one, several, or across multiple client devices 112). The tortuosity system 120 may facilitate determining and/or quantifying tortuosity of the wellbore 102.

Figure 2:
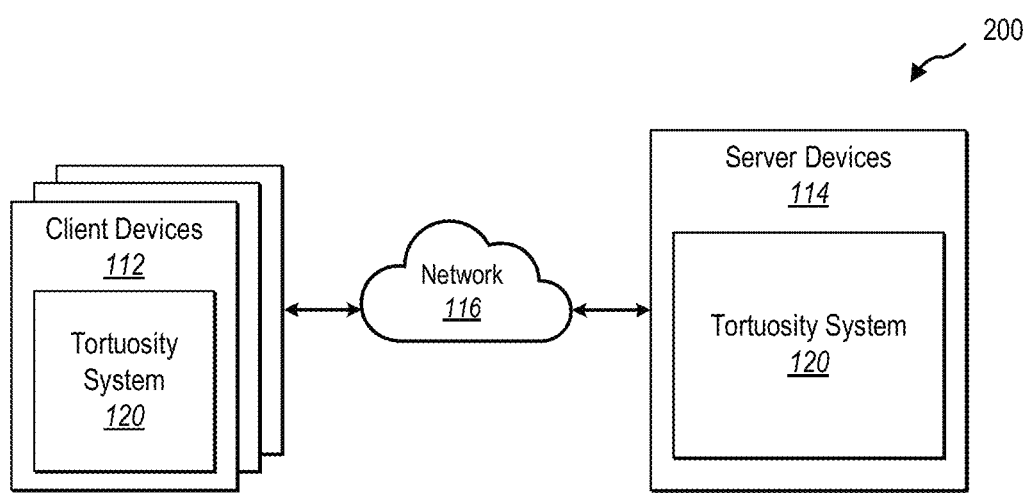
FIG. 2 illustrates an example environment 200 in which a tortuosity system 120 is implemented, according to at least one embodiment of the present disclosure.

FIG. 2 illustrates an example environment 200 in which a tortuosity system 120 is implemented in accordance with one or more embodiments describe herein. As shown in FIG. 2, the environment 200 includes one or more server device(s) 114. The server device(s) 114 may include one or more computing devices (e.g., including processing units, data storage, etc.) organized in an architecture with various network interfaces for connecting to and providing data management and distribution across one or more client systems. As shown in FIG. 2, the server devices 114 may be connected to and may communicate with (either directly or indirectly) one or more client devices 112 through a network 116. The network 116 may include one or multiple networks and may use one or more communication platforms and/or technologies suitable for transmitting data. The network 116 may refer to any data link that enables transport of electronic data between devices of the environment 200. The network 116 may refer to a hardwired network, a wireless network, or a combination of a hardwired network and a wireless network. In one or more embodiments, the network 116 includes the internet. The network 116 may be configured to facilitate communication between the various computing devices via well-site information transfer standard markup language (WITSML) or similar protocol, or any other protocol or form of communication.

The client device 112 may refer to various types of computing devices. For example, one or more client devices 112 may include a mobile device such as a mobile telephone, a smartphone, a personal digital assistant (PDA), a tablet, a laptop, or any other portable device. Additionally, or alternatively, the client devices 112 may include one or more non-mobile devices such as a desktop computer, server device, surface or downhole processor or computer (e.g., associated with a sensor, system, or function of the downhole system), or other non-portable device. In one or more implementations, the client devices 112 include graphical user interfaces (GUI) thereon (e.g., a screen of a mobile device). In addition, or as an alternative, one or more of the client devices 112 may be communicatively coupled (e.g., wired or wirelessly) to a display device having a graphical user interface thereon for providing a display of system content. The server device(s) 114 may similarly refer to various types of computing devices. Each of the devices of the environment 200 may include features and/or functionalities described below in connection with FIG. 18.

As shown in FIG. 2, the environment 200 may include a tortuosity system 120 implemented on one or more computing devices. The tortuosity system 120 may be implemented on one or more client device 112, server devices 114, and combinations thereof. Additionally, or alternatively, the tortuosity system 120 may be implemented across the client devices 112 and the server devices 114 such that different portions or components of the tortuosity system 120 are implemented on different computing devices in the environment 200. In this way, the environment 200 may be a cloud computing environment, and the tortuosity system 120 may be implemented across one or more devices of the cloud computing environment in order to leverage the processing capabilities, memory capabilities, connectivity, speed, etc. that such cloud computing environments offer in order to facilitate the features and functionalities described herein.

Figure 3:
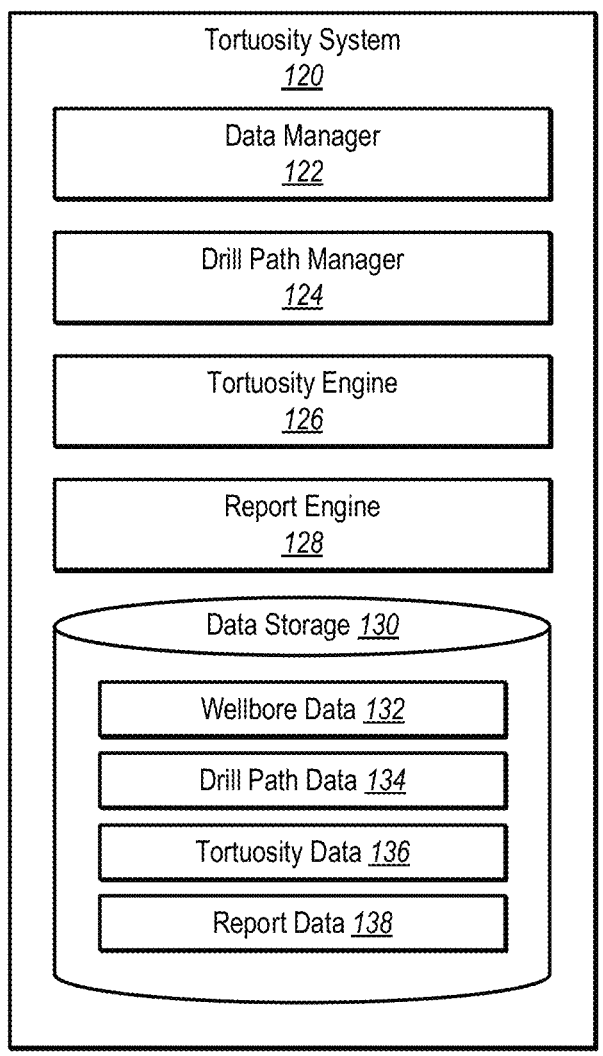
FIG. 3 illustrates an example implementation of a tortuosity system as described herein, according to at least one embodiment of the present disclosure.

FIG. 3 illustrates an example implementation of the tortuosity system 120 as described herein, according to at least one embodiment of the present disclosure. Tortuosity may refer to a degree of curvature of a wellbore, or deviation of the wellbore from a straight path. For example, tortuosity may describe the irregularity or winding of a wellbore as it progresses through the subsurface formations. High tortuosity may typically increase drilling complexity and may present challenges in maintaining a desired well plan. Tortuosity may be one or more of measured, described, or quantified in a variety of different ways. In many cases, it may be difficult to accurately conceptualize and represent the degree of tortuosity of a wellbore.

Tortuosity may be caused by a number of different factors and may have many different results and/or consequences. For example, tortuosity may be resultant from a well plan, BHA design, direction and inclination quality and/or placement, telemetry speeds, steering control loops, directional drilling systems, drilling and/or hydraulics practice, geosteering, geomechanics and formation effects, or any other factor, or combinations thereof. Tortuosity may have consequences for the drilling of the wellbore, such as BHA wear, the reach of the wellbore, downhole tools getting stuck and/or left in the wellbore, twist off, rate of penetration, LWD and MWD quality, hole cleaning, survey quality, well placement, casing wear, or any other effect and/or consequence. Similarly, tortuosity may affect the running of casing and/or cementing of the wellbore, such as casing getting stuck or left in the wellbore, twist off or connector damage of casing sections, poor seals and/or leaking of casing, slow installation, perforation or squeezing of casing, fracking efficiency, or any other effect. Tortuosity may affect the installation and working life of downhole tools implemented in the wellbore, such as electronic submersible pumps. Tortuosity can affect the production from a wellbore, such as from wear to sucker rods, reduced drain length, poor well placement, and sand build up. One or more of these effects and consequences may result in delayed or lost work, which may be costly. Thus, it may be advantageous to characterize, classify, or quantify tortuosity in a simple and meaningful way in order to better understand how to minimize or handle tortuosity in a downhole system.

The tortuosity system 120 may be a computer-implemented system for determining one or more metrics for understanding and quantifying the tortuosity of an underground wellbore. For example, the tortuosity system 120 may determine a tortuosity length metric and/or tortuosity diameter metric for one or more measurement depths (MD) of the wellbore. The tortuosity system 120 may determine a cumulative tortuosity angle metric for one or more MDs of the wellbore. The tortuosity system may generate and/or present a plot presenting any combination of these metrics to facilitate understanding the tortuosity at one or more locations of the wellbore.

The tortuosity system 120 may include a data manager 122, a drill path manager 124, a tortuosity engine 126, and a report manager 128. The tortuosity system 120 may also include a data storage 130 having wellbore data 132, drill path data 134, tortuosity data 136, and report data 138 stored thereon. While one or more embodiments described herein describe features and functionalities performed by specific components 122-128 of the tortuosity system 120, it will be appreciated that specific features described in connection with one component of the tortuosity system 120 may, in some examples, be performed by one or more of the other components of the tortuosity system 120.

By way of example, one or more of the data receiving, gathering, or storing features of the data manager 122 may be delegated to other components of the tortuosity system 120. As another example, while a drill path may be determined from the survey data by the drill path manager 124, in some instances, some or all of these features may be performed by the tortuosity engine 126 (or other component of the tortuosity system 120). Indeed, it will be appreciated that some or all of the specific components may be combined into other components and specific functions may be performed by one or across multiple components 122-128 of the tortuosity system 120.

Additionally, while FIG. 1, for example, depicts the tortuosity system 120 implemented on a client device 112 of the downhole system, it should be understood that some or all of the features and functionalities of the tortuosity system 120 may be implemented on or across multiple client devices 112 and/or server devices 114. For example, data may be input and/or received by the data manager 122 on a (e.g., local) client device, and one or more tortuosity metrics may be determined by the tortuosity engine 126 on one or more of a remote, server, or cloud device. Indeed, it will be appreciated that some or all of the specific components 122-128 may be implemented on or across multiple client devices 112 and/or server devices 114, including individual functions of a specific component being performed across multiple devices.

As mentioned above, the tortuosity system 120 includes a data manager 122. The data manager 122 may receive a variety of types of data associated with the downhole system and may store the data to the data storage 130 as wellbore data 132. The data manager 122 may receive the wellbore data 132 from a variety of sources, such as from sensors, surveying tools, downhole tools, other (e.g., client) devices, user input, historical records or databases, etc.

In some embodiments, the wellbore data 132 includes survey data. The survey data may include information about one or more of the orientation, position, or trajectory of a wellbore drilling (or as it is being drilled) into subsurface formations. For example, the survey data may include an azimuth and inclination for the wellbore with respect to one or more measurement depths (MD) of the wellbore. The survey data may be measured and/or taken by one or more of a MWD, LWD, RSS, wireline logging tool, or any other suitable measurement device. The survey data may be taken or measured while drilling, or may be measured after drilling has been paused or completed. In some embodiments, the data manager 122 receives the survey data in real time in order to facilitate one or more of the (e.g., real-time) functionalities of the tortuosity system 120 discussed herein. The survey data may be measured at discrete intervals, or discrete MDs of the wellbore. For example, the survey data may be measured every 10 feet, 50 feet, or 100 feet. In some embodiments, the survey data is measured continuously at substantially every MD.

In some embodiments, the wellbore data 132 includes wellbore shape data. The wellbore shape data may indicate a shape of a cross-section of the wellbore at one or more measurement depths. For example, in some embodiments, the wellbore has a substantially circular or round cross-section, and the wellbore shape data indicates the diameter of the wellbore. In another example, the diameter of the wellbore may change one or more times over the length or depth of the wellbore, and the wellbore shape data may indicate the diameter of the wellbore with respect to various MDs. In some embodiments, the wellbore diameter is determined based on a diameter of a tool used to drill and/or widen specific portions of the wellbore. In some embodiments, the wellbore shape diameter is determined based on measurements taken, for example, by a downhole caliper. In some cases, a wellbore may have a non-circular cross-section. For example, the cross-section may be an irregular shape. The wellbore shape data may indicate the shape and/or dimensions of the irregular shaped-cross-section, such as based on one or more measurements taken by one or more downhole sensors.

In some embodiments, the wellbore data includes one or more additional types of data, for example, in addition to inclination and azimuth. For instance, the wellbore data may include and/or may indicate, a toolface angle, geographical position, formation evaluation data, pressure and temperature data, magnetic data, fluid properties, geological data, vibration and shock data, flow data, casing and cement data, geosteering data, any other type of data associated with the wellbore and/or the downhole system, or combinations thereof.

In some embodiments, the data manager 122 receives user input. The data manager 122 may receive the user input, for example, via any of the client devices 112 and/or server devices 114. Any of the data described herein may be input or augmented via the user input. For example, in some instances, some or all of the survey data is received by the data manager 122 as user input. The user input may be received in or associated with one or more functions or features of the tortuosity system 120, such as part of selecting one or more of reference diameters, reference lengths, or measurement diameters of interest.

In this way, the tortuosity system 120 may receive any of a variety of types of data. The data manager 122 may save and/or store any of the data it receives to the data storage 130 as wellbore data 132.

Figures 1, 4:
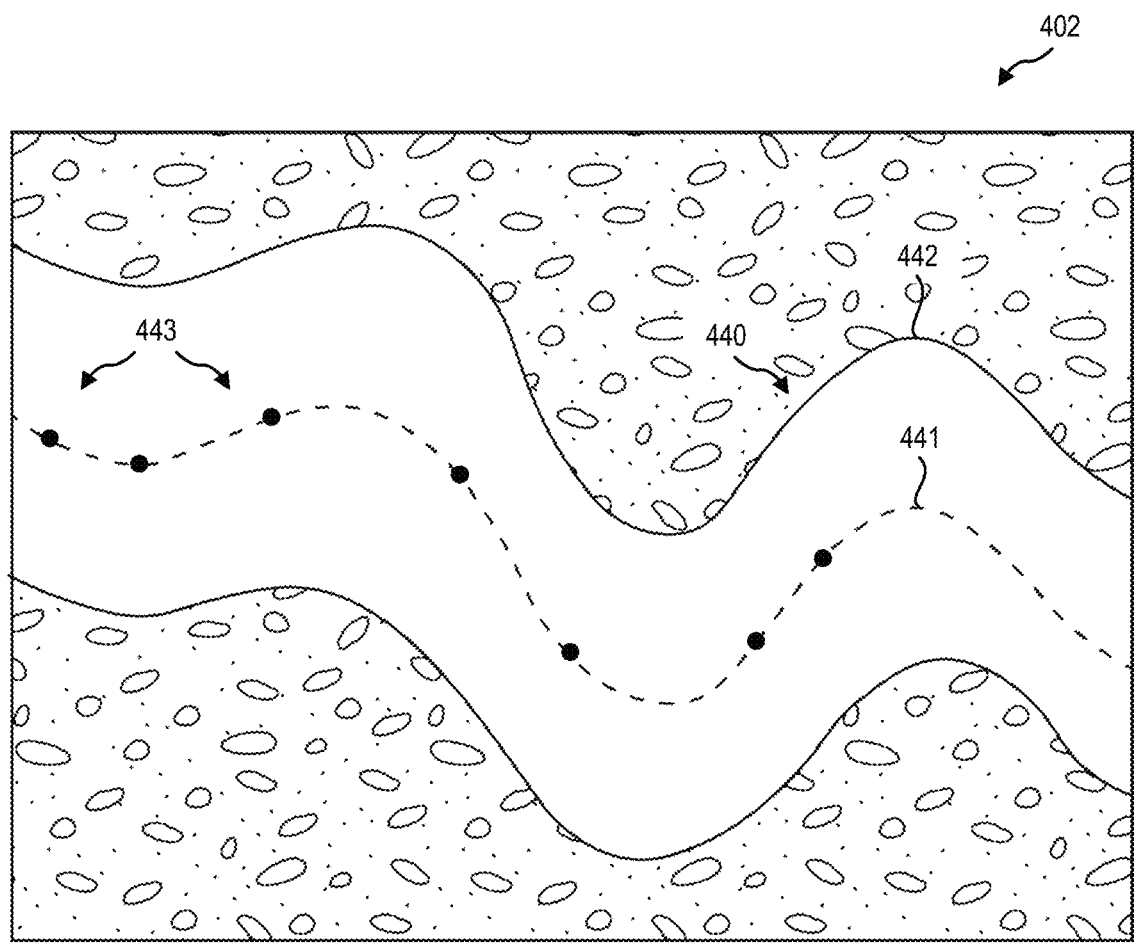
Figures 2, 4:
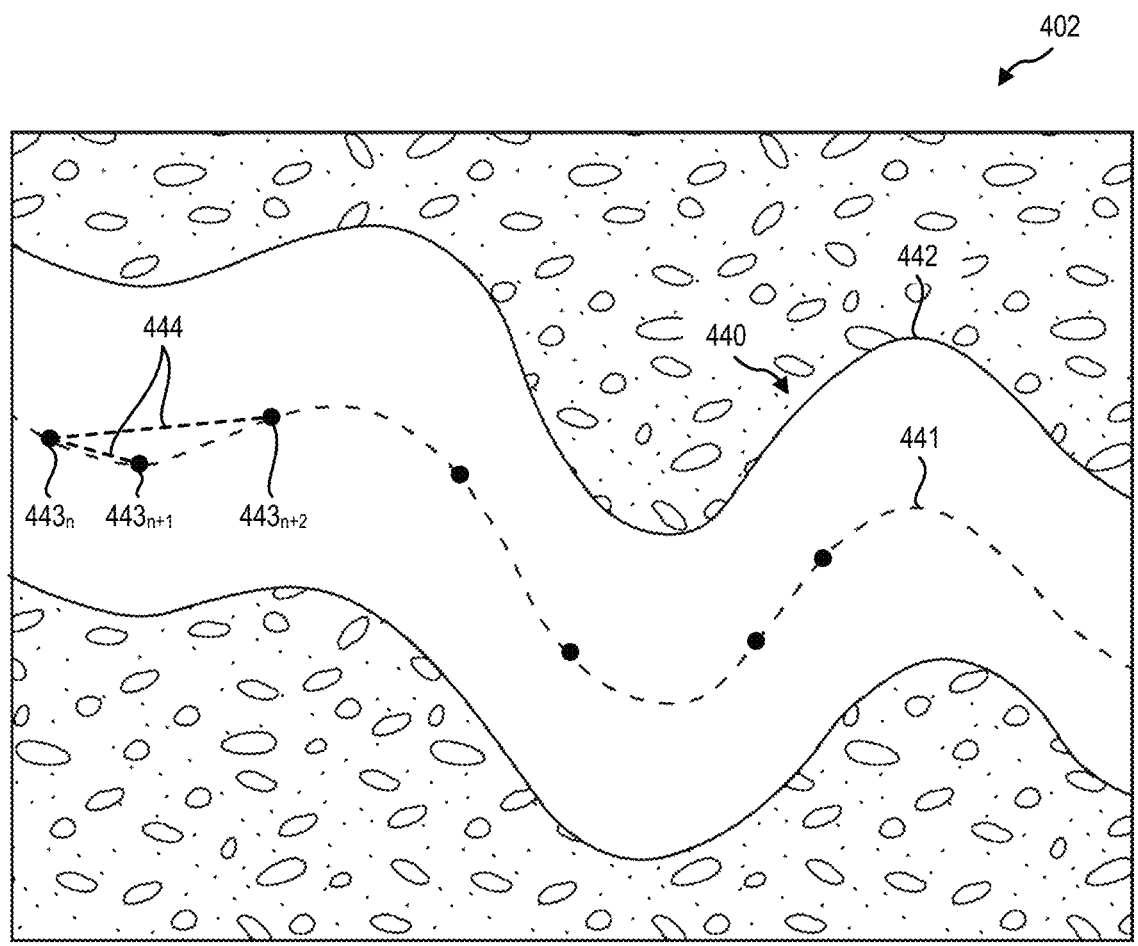
Figures 3, 4:
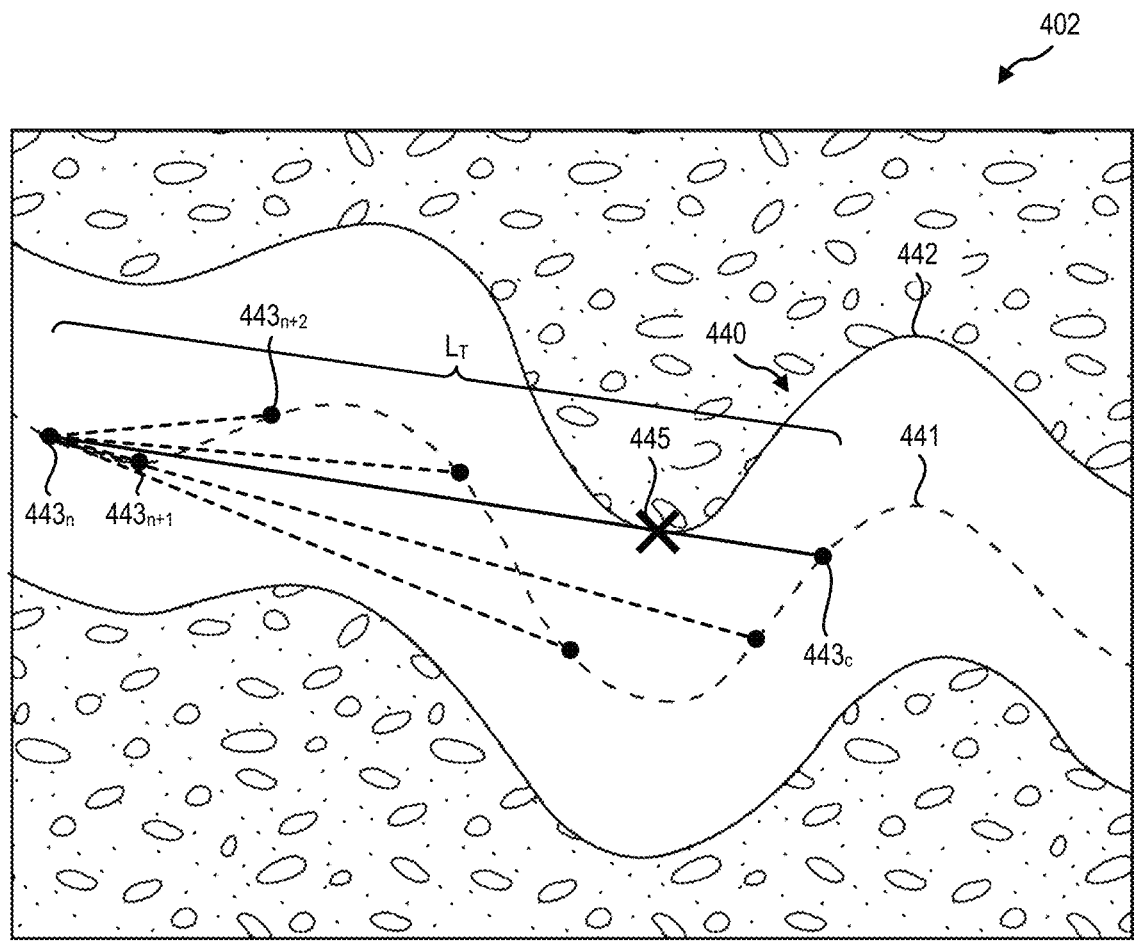
Figure 4:
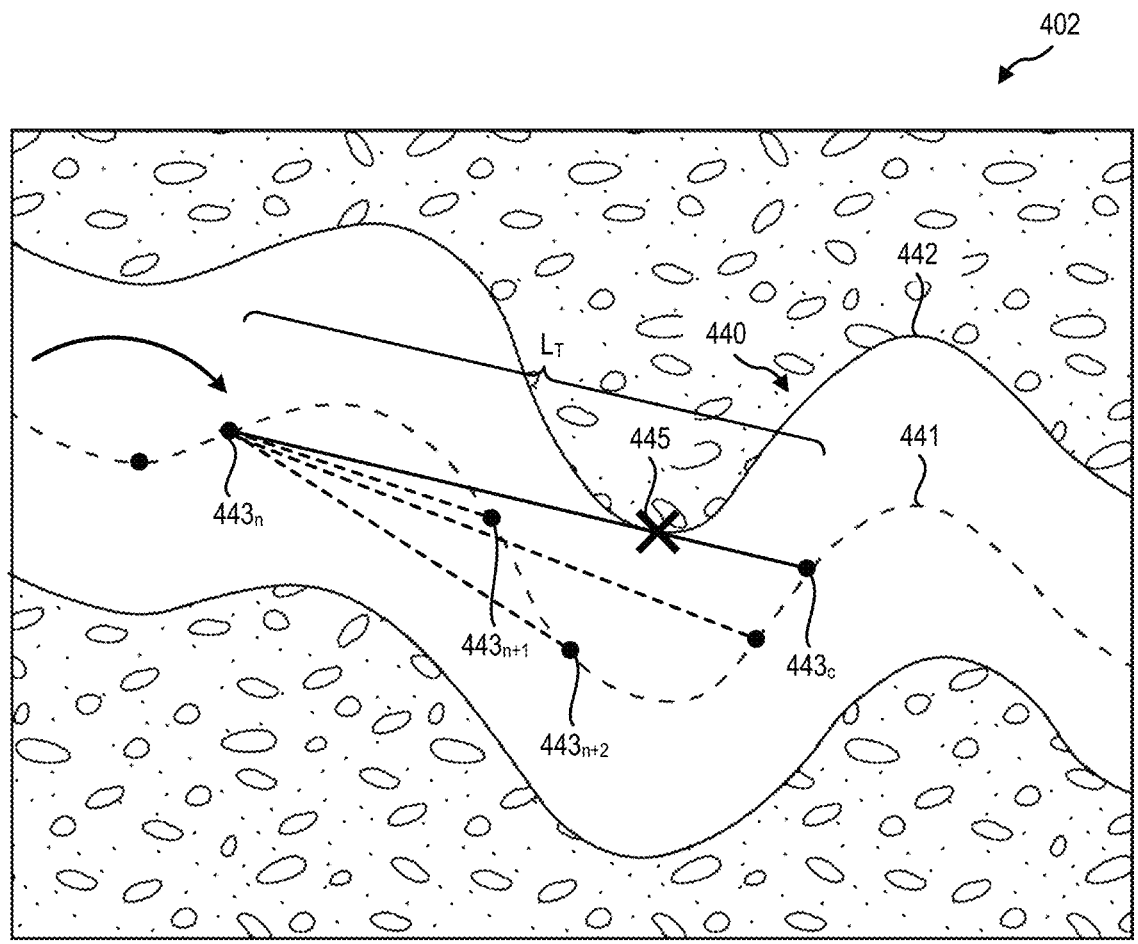

FIG. 4-1 is a representation of a wellbore 402, according to at least one embodiment of the present disclosure. As shown, the wellbore 402 may exhibit a certain form with certain contours, bends, shapes, etc. The wellbore 402 of FIG. 4 is shown with an exaggerated shape and/or with exaggerated features (e.g., curves) for the purposes of discussing the features and functionalities of the tortuosity system 120. The wellbore 402 is shown in FIG. 4 having a generally lateral or sideways orientation, but it should be understood that the wellbore 402 may have a generally downward orientation, or any other orientation. Additionally, the representation of the wellbore 402 is shown as 2-dimensional, but it should be understood that the features and functionalities discussed herein with respect to the wellbore 402 may be performed in 3-dimensional space or with respect to a 3-dimensional coordinate system representing 3-dimensional aspects of the wellbore 402.

As mentioned above, the tortuosity system 120 includes a drill path manager 124. In some embodiments, the drill path manager 124 determines a drill path 440 for the wellbore 402. The drill path 440 may identify and/or represent the trajectory, direction, shape, length, angle, etc., for the wellbore 402 at each MD. For example, the drill path 440 may identify the location of a wellbore wall 442, may identify one or more MDs 443, and may define a centerline 441 of the wellbore 402. The drill path manager 124 may determine the drill path 440 based on the survey data, or more specifically, based on the inclination and azimuth at each MD.

The drill path manager 124 may determine the centerline 441 based on a cross-section of the wellbore 402 at each MD. For example, the drill path manager 124 may determine a shape of the cross-section of the wellbore 402 at each MD. In some cases, the drill path manager 124 receives the shape from the wellbore shape data. In some cases, the drill path manager 124 calculates or determines the shape and in this way generates the wellbore shape data. The drill path manager 124 may determine a center of the cross-section of the wellbore 402 at each MD and may define the drill path 440 as passing through each of the centers. For example, in some cases, the cross-section of the wellbore 402 is substantially round or circular at one or more MDs, and the drill path manager 124 may define the drill path as passing through the center of each circular cross-section at these MDs. In some cases, the cross-section of the wellbore is non-circular and/or an irregular shape at one or more MDs. The drill path manager 124 may accordingly determine a centroid of the irregular cross-section. For example, the drill path manager 124 may determine the centroid based on determining a center of mass, center of gravity, or average coordinate for the irregular shape, or any other method. The drill path manager 124 may accordingly define the drill path 440 as passing through the centroid at these MDs. The drill path manager 124 may store any of the information it generates to the data storage 130 as drill path data 134.

As mentioned above, the tortuosity system 120 includes a tortuosity engine 126. The tortuosity engine 126 may determine one or more tortuosity metrics for describing and/or quantifying the tortuosity of the wellbore 402. For example, the tortuosity metrics may include one or more of a tortuosity length, tortuosity depth, and cumulative angle, or any other metric. FIGS. 4-2 through 4-7 are representations of the wellbore 402 including various schematic representations illustrating features of the tortuosity system 120, according to at least one embodiment of the present disclosure.

In some embodiments, the tortuosity engine 126 determines one or more tortuosity lengths $L_T$ for one or more MDs of the wellbore 402. The tortuosity length $L_T$ may be a measure of a maximum length that a perfectly straight path can extend downward from a given MD before encountering a section of the wellbore 402 through which it can no longer pass (e.g., without bending). A specific reference diameter may be associated with the straight path for determining the tortuosity length $L_T$. Put another way, the tortuosity length $L_T$ may be the maximum length that an infinitely stiff tubular of a given reference diameter can be extended down the borehole from a given MD before contacting and/or being inhibited by the wellbore wall 442.

The tortuosity engine 126 may determine the tortuosity length $L_T$ for one or more (or all) MDs 443. By way of example, the tortuosity engine 126 may determine a tortuosity length $L_T$ with an associated reference diameter of 0, or a tortuosity length $L_T$ for a tubular 444 with an infinitely small reference diameter. In this way the tubular 444 may be represented by a single line with no thickness.

As shown in FIG. 4-2, to determine the tortuosity length $L_T$, the tortuosity engine 126 may begin with a first MD $443_n$. The tortuosity engine 126 may simulate extending the tubular 444 along the centerline 441 until the tubular 444 encounters the wellbore wall 442 and can no longer proceed. For example, the tortuosity engine 126 may extend the tubular 444 from the first MD $443_n$ to a second MD $443_{n+1}$. The second MD $443_{n+1}$ may be an immediately successive MD 443 to the first MD $443_n$, or may be a MD 443 of some other interval downhole from the first MD $443_n$. The tortuosity engine 126 may determine whether the tubular 444 extended to the second MD $443_{n+1}$ encounters or contacts the wellbore wall 442. If the tortuosity engine 126 determines that the tubular 444 can extend to the second MD $443_{n+1}$ without being inhibited by the wellbore wall 442, the tortuosity engine 126 may proceed by simulating extending the tubular 444 to a third MD $443_{n+2}$. The tortuosity engine 126 may accordingly determine whether the tubular 444 encounters the wellbore wall 442 extended to the third MD $443_{n+2}$. In this way, the tortuosity engine 126 may simulate an extension of the tubular 444 to various discrete MDs 443.

As shown in FIG. 4-3, the tortuosity engine 126 may proceed in this manner through several (e.g., many) successive MDs 443 downhole from the first MD $443_n$. Eventually, the tortuosity engine 126 may identify a simulated contact 445 of the tubular 444 with the wellbore wall 442 based on the tubular 444 being extended to a critical MD $443_c$. The tortuosity engine 126 may identify this critical MD $443_c$ as the furthest extent to which the tubular 444 may extend along the centerline 441 from the first MD $443_n$. The tortuosity engine 126 may determine the length of the tubular 444 associated with the critical MD $443_c$ and may accordingly define this length as the tortuosity length $L_T$ for the first MD $443_n$. The tortuosity engine 126 may store the determined tortuosity length $L_T$ to the data storage 130 as tortuosity data 136.

As shown in FIG. 4-4, after determining the tortuosity length $L_T$, the tortuosity engine 126 may then advance to a next MD 443 for determining the tortuosity length $L_T$ for that next MD 443, which may be an immediately successive MD 443, or may be a MD 443 as some other interval downhole. For example, the next MD 443 may be established as the first MD $443_n$ for proceeding through the process described above for the next MD 443. In this way, the tortuosity engine 126 may iterate this process for determining the next tortuosity length $L_T$. The tortuosity engine 126 may iteratively proceed in this manner for determining the tortuosity length $L_T$ for any number of MDs 443 for one or more (or all) locations or lengths of interest of the wellbore 402. The tortuosity engine 126 may store all of the determined tortuosity lengths $L_T$ to the data storage 130 as tortuosity data 136. The tortuosity lengths $L_T$ in this way may facilitate describing and/or quantifying the tortuosity of the wellbore 402 with respect to various (or all) MD of the wellbore 402.

As mentioned, the tortuosity lengths $L_T$ described above may correspond to a tubular of an infinitely small diameter, or a reference diameter of 0 (e.g., any units). This infinitely small reference diameter may represent a maximum or upper bound of the tortuosity lengths $L_T$ for a given MD 443. In some embodiments, the tortuosity engine 126 determines one or more tortuosity lengths $L_T$ for each MD 443 for tubulars having one or more finite reference diameters. For example, as shown in FIGS. 4-5 through 4-7, the tortuosity engine 126 may implement the process described above with respect to various simulated tubulars 444-1, 444-2, and 444-3 having various reference diameters D. As described above, the tortuosity engine 126 may simulate extending the tubulars 444-1, 444-2, and 444-3 from a first MD $443_n$ along the centerline until the tubular encounters the wellbore wall 442 and can no longer proceed, and the associated tortuosity length $L_T$ may be determined. In this way, the tortuosity engine 126 may determine multiple tortuosity lengths $L_T$ corresponding to multiple reference diameters D of tubulars for one or more MDs 443 of interest. As shown, larger reference diameters D may generally correspond with a shorter overall tortuosity length $L_T$. The tortuosity engine 126 may determine tortuosity lengths $L_T$ associated with any size of reference diameter D, and for any number of tubular diameters D. For example, as described above, the tortuosity engine 126 may determine tortuosity lengths $L_T$ for a simulated tubular with a reference diameter D as small as 0. In another example, the tortuosity engine 126 may determine tortuosity lengths $L_T$ for a simulated tubular with reference diameters D as large as slightly below the gauge diameter of the wellbore 402, such as a reference diameter D of 0.25 inches less than the gauge diameter of the wellbore 402. In this way, one or more (or all) MDs may be associated with several tortuosity lengths $L_T$ corresponding with several reference diameters D in order to characterize the tortuosity at each MD with respect to a wide range of possible tubular diameters.

The reference diameter(s) D may be chosen and/or implemented in a variety of ways. In some embodiments, a reference diameter D may be determined based on an associated downhole tool for implementing in the wellbore. For instance, the reference diameter D may be a diameter which may substantially envelope or enclose a downhole tool. For example, some downhole tools may be substantially cylindrical, and an associated reference diameter D may be the diameter of the downhole tool. In another example, some downhole tools may not be substantially cylindrical and/or may include one more features that protrude, stick out, or otherwise extend from the downhole tool. The reference diameter D may accordingly be a diameter which may completely or substantially enclose or envelop the downhole tool, including any extending features. In some embodiments, a downhole tool may exhibit one or more bends or curves (e.g., relative to a longitudinal axis), and the reference diameter D may be a diameter defining a cylinder which may substantially enclose the downhole tool.

In some cases, multiple reference diameters D may be selected based on a downhole tool, such as multiple reference diameters that may encase the downhole tool to varying degrees. In some embodiments, the reference diameter may include a buffer, envelope, or safety factor, etc. such that the reference diameter may be slightly larger than the diameter determined according to one or more of the criteria just mentioned. In this way, the reference diameter D may correspond with diameters of interest that are relevant to one or more downhole tools. In some embodiments, the tortuosity engine 126 may determine the reference diameters D for a downhole tool, such as based on a geometry of the downhole tool. In some embodiments, the tortuosity engine 126 may facilitate determining and/or selecting one or more reference diameter D, such as based on user input.

Figures 4, 5:
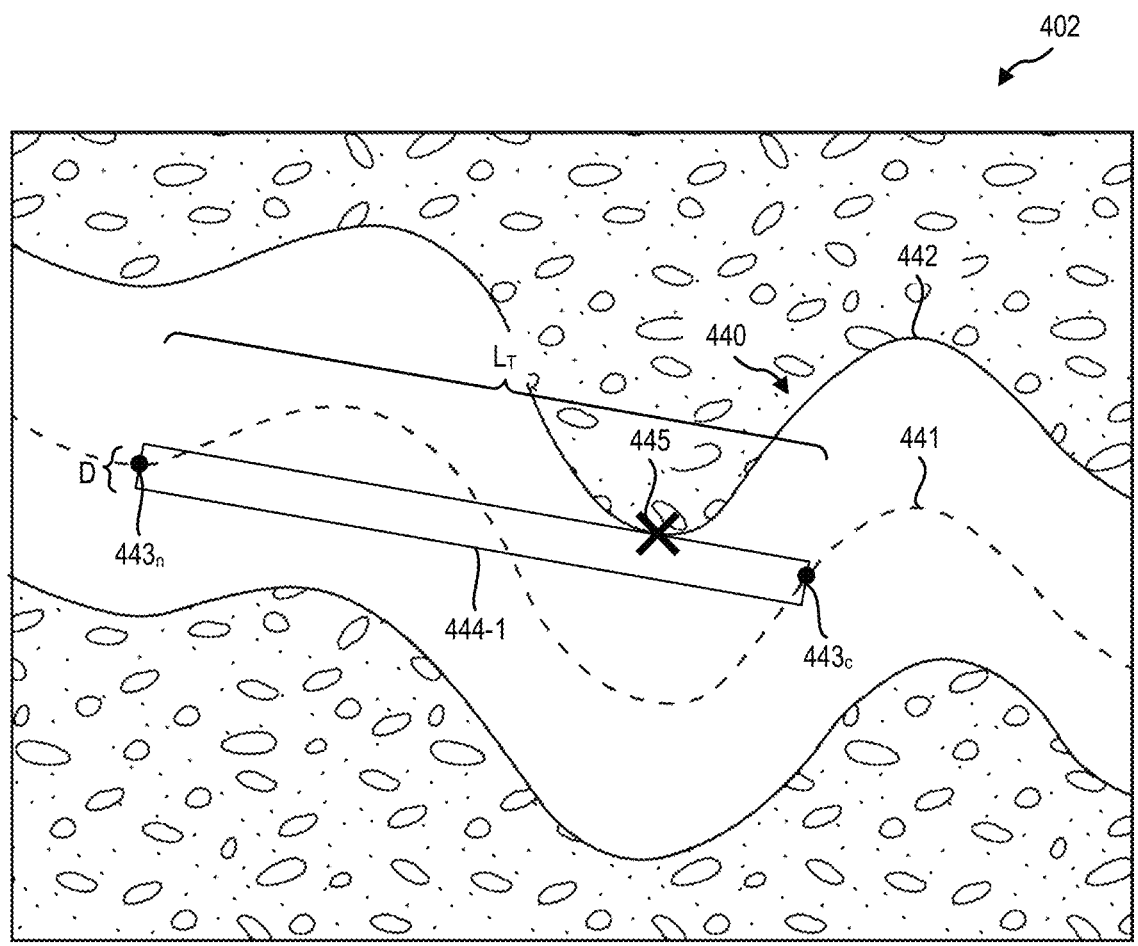

FIG. 5 is a graphical representation of a technique for determining a tortuosity length $L_T$ for a MD of a wellbore. In order to determine a tortuosity length $L_T$ for a given MD, the tortuosity engine 126 may define a coordinate system having a horizontal axis, or m-axis, aligned nominally tangential to the direction of drilling, and a vertical axis representing both the lateral borehole propagation response H(m) (e.g., the deviation of the centerline of the wellbore from a straight path) as well as the radius, D(m)/2, of the wellbore at that MD. The radius/diameter of the wellbore may be indicated in the wellbore data, such as from a measurement taken by a downhole caliper. The tortuosity length $L_T$ can be determined or calculated in a variety of ways.

In some situations, the wellbore diameter is constant at one or more MDs and/or the wellbore diameter is constrained as constant in the calculation of the tortuosity length $L_T$, such as to simplify the calculation. For example, the tortuosity length $L_T$ may be determined as a function of the MD of interest and a constant wellbore diameter, according to the following formula:

$L_t(MD,D)$=the minimum positive value of $\tau$ to satisfy the function:

$$\delta(\tau, x) = \left\| Hy(MD + x) - \left[ \frac{Hy(MD + \tau) - Hy(MD)}{\tau} x + Hy(MD) \right] \right\| - \frac{D}{2} = 0$$

when assessed for all values of the floating variable x between 0 and $\tau$ for the given borehole diameter D.

In some situations, the wellbore diameter is not constant, or is not held constant for the purposes of the calculation. For example, the tortuosity length $L_T$ may be determined as a function of the MD, and also as a function of a wellbore diameter, which may also be a function of the MD, according to the following formula:

$L_t(MD,D(MD))$=the minimum positive value of $\tau$ to satisfy the function:

$$\delta y(\tau, x) = \left\| Hy(MD + x) - \left[ \frac{Hy(MD + \tau) - Hy(MD)}{\tau} x + Hy(MD) \right] \right\| - \frac{D(MD + x)}{2} = 0$$

when assessed for all values of the floating variable x between 0 and $\tau$ for the given borehole diameter D.

In some embodiments, the previous two equations are in relation to the build plane (e.g., 2-dimensions). In some embodiments, the turn plane borehole undulation is included in the calculation to determine the tortuosity length $L_T$ (e.g., in 3-dimensions). For example, the tortuosity length $L_T$ may be determined according to the following formula:

$$L_t(MD, D(MD)) =$$

the minimum positive value of $\tau$ to satisfy the function:

$$\delta yz(\tau, x) = \left[\left[Hy(MD+x) - \left[\frac{Hy(MD+\tau) - Hy(MD)}{\tau}x + Hy(MD)\right]\right]^2 + \left[Hz(MD+x) - \left[\frac{Hz(MD+\tau) - Hz(MD)}{\tau}x + Hz(MD)\right]\right]^2 - \frac{D(MD+x)^2}{4}\right] = 0$$

when assessed for all values of the floating variable x between 0 and $\tau$ for the given borehole diameter D.

While these example formulas, as well as the associated graphical representation of FIG. 5 have been described as being nominally tangentially aligned to the borehole, the same or similar calculations may be performed in any suitable coordinate system that facilitates the computation of the nearest distance between the centerlines of the stiff tubular and of the borehole.

Figures 4, 5, 6:
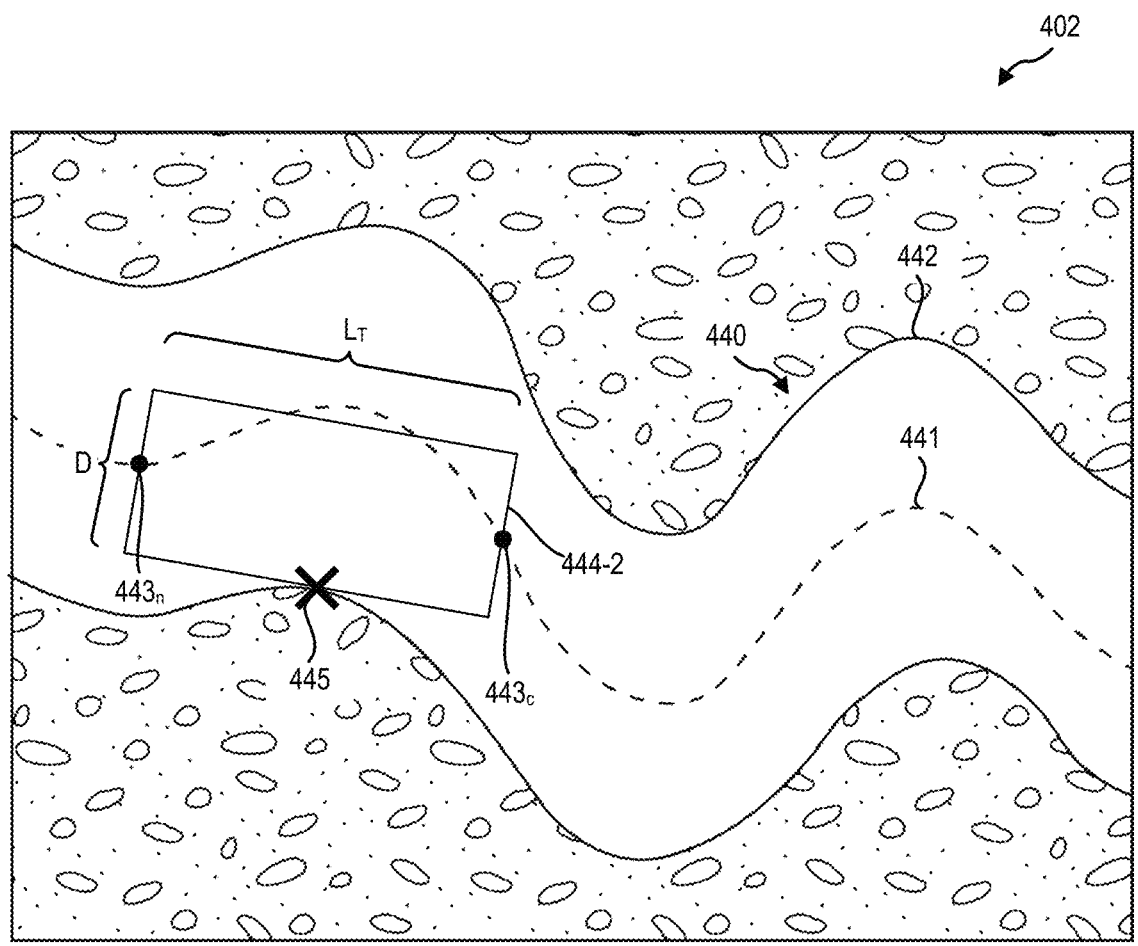
Figures 4, 5, 6, 7:
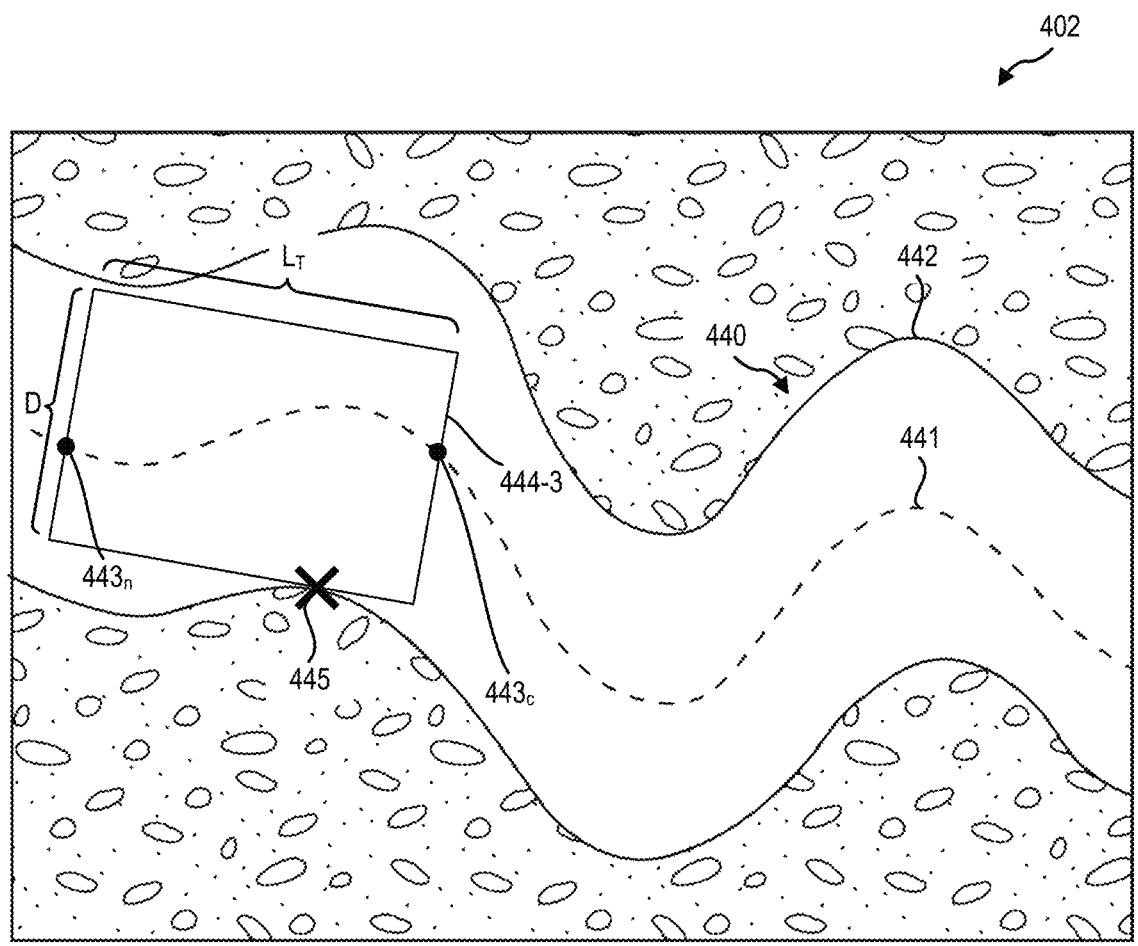
Figure 5:
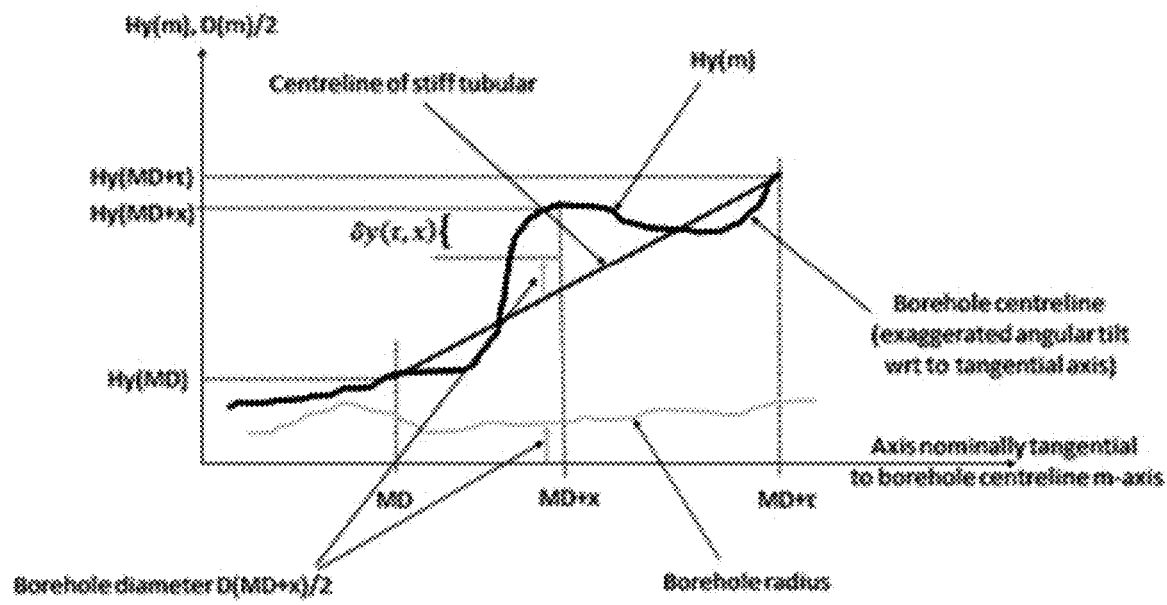
Figures 1, 6:
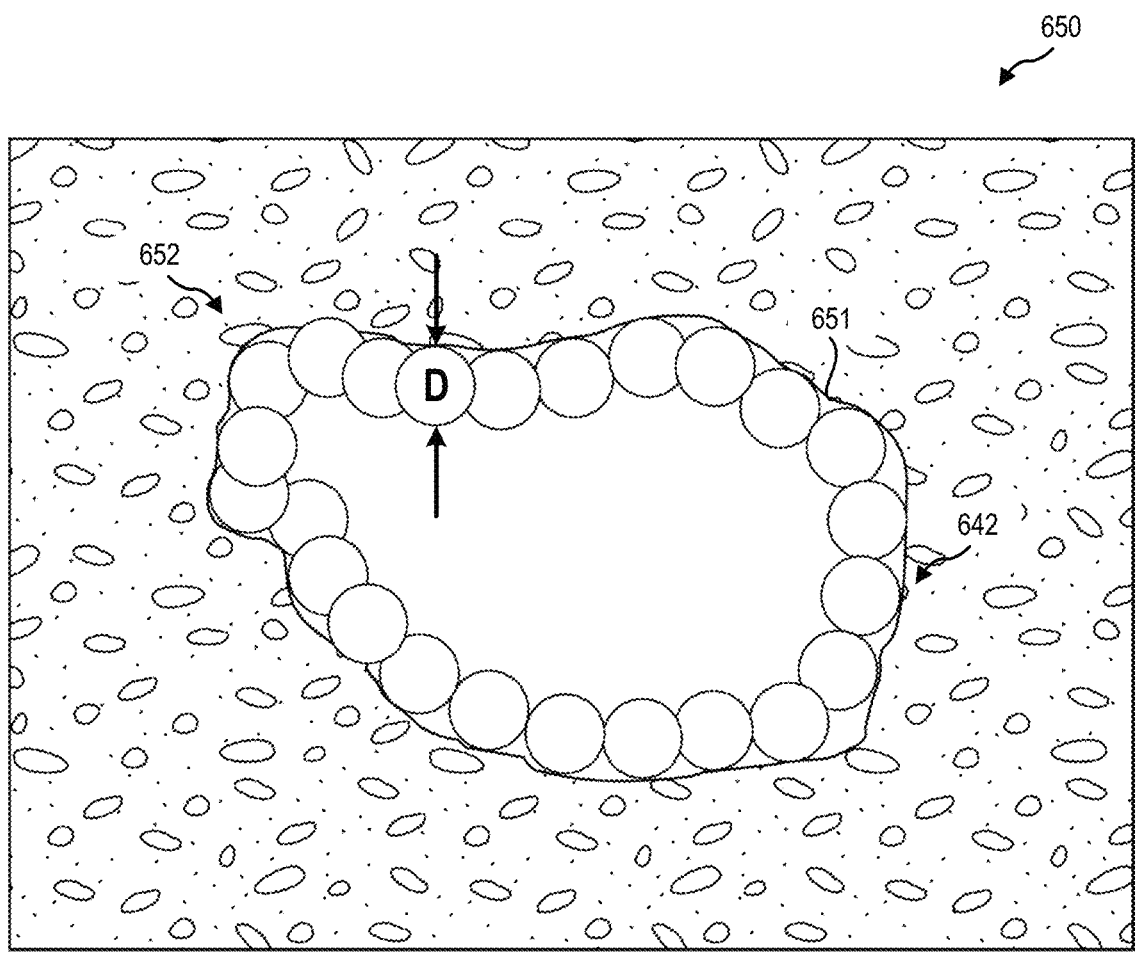
Figures 2, 6:
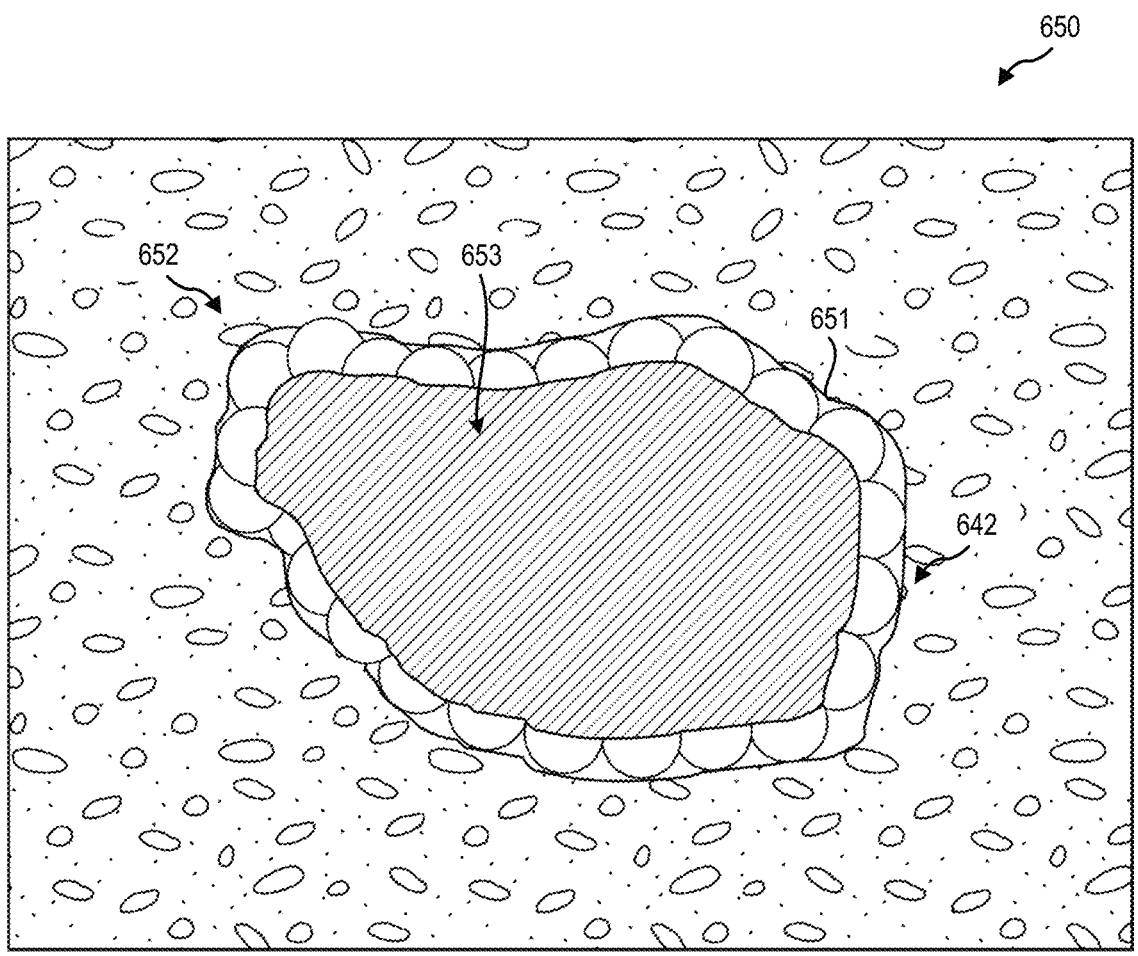
Figures 3, 6:
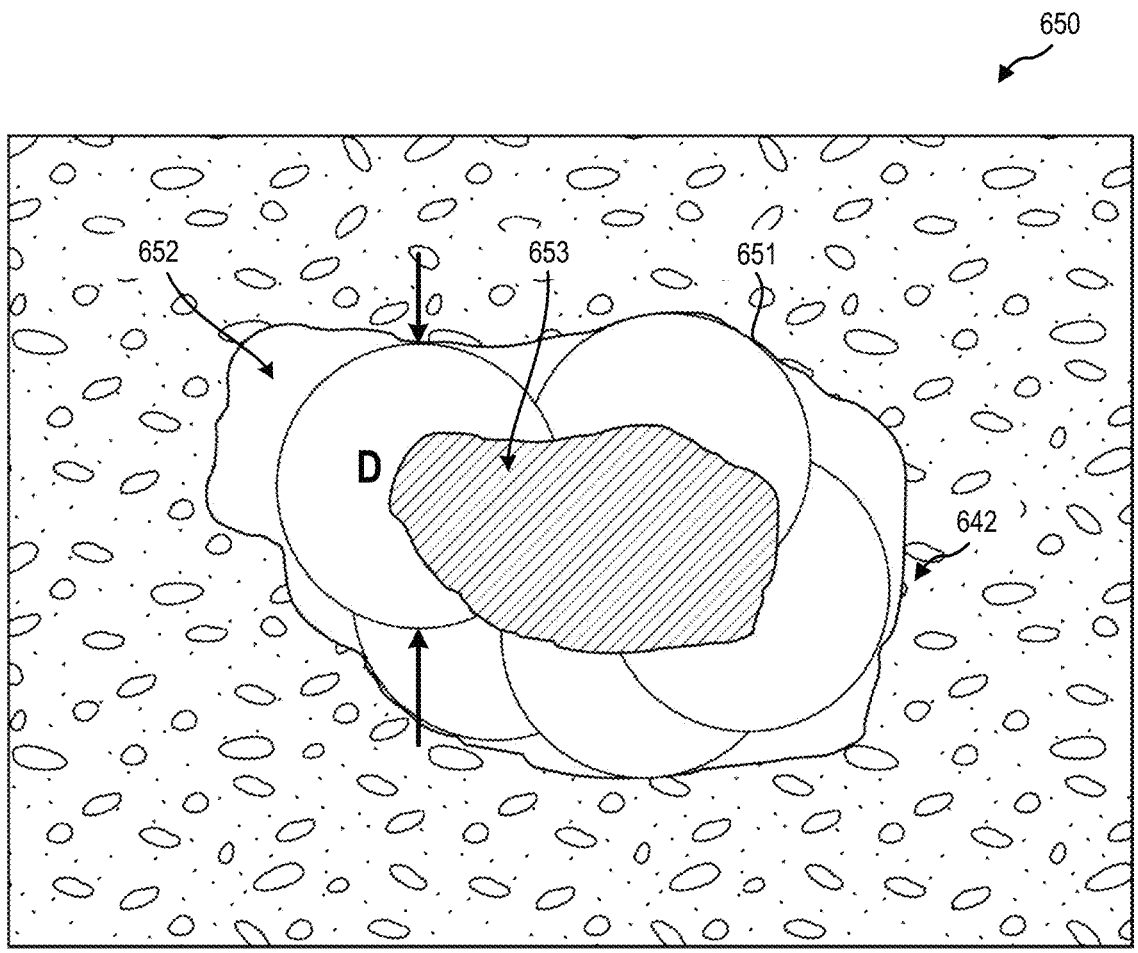
Figures 4, 6:
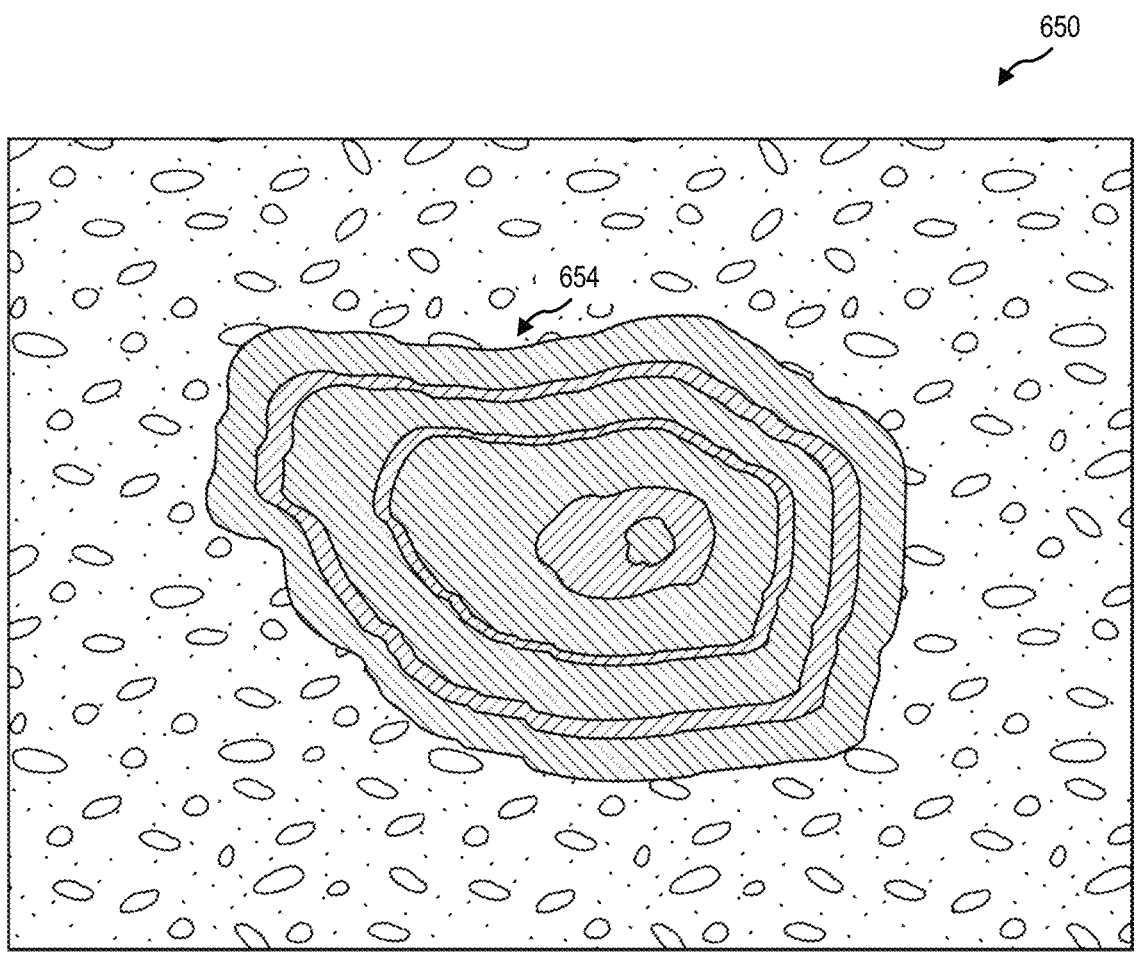
Figures 5, 6:
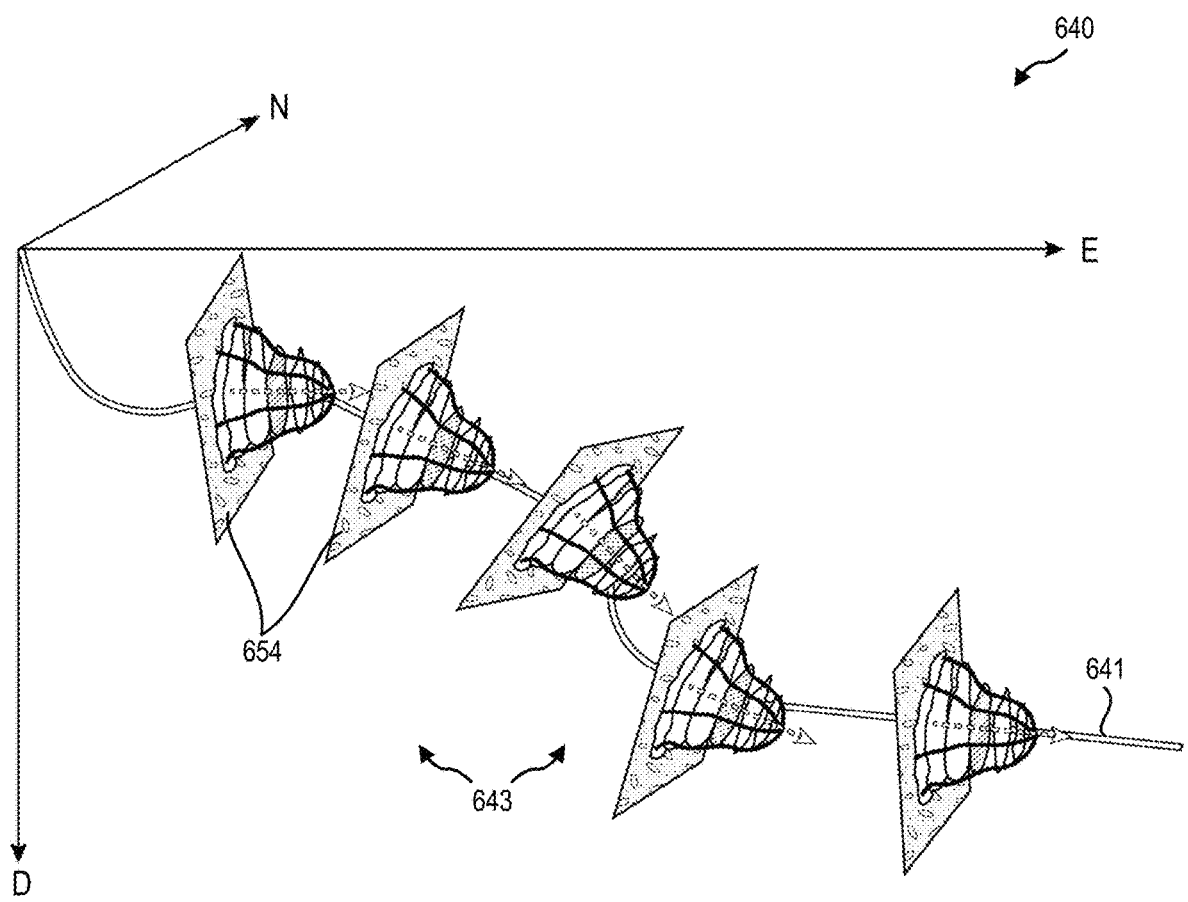
Figure 6:
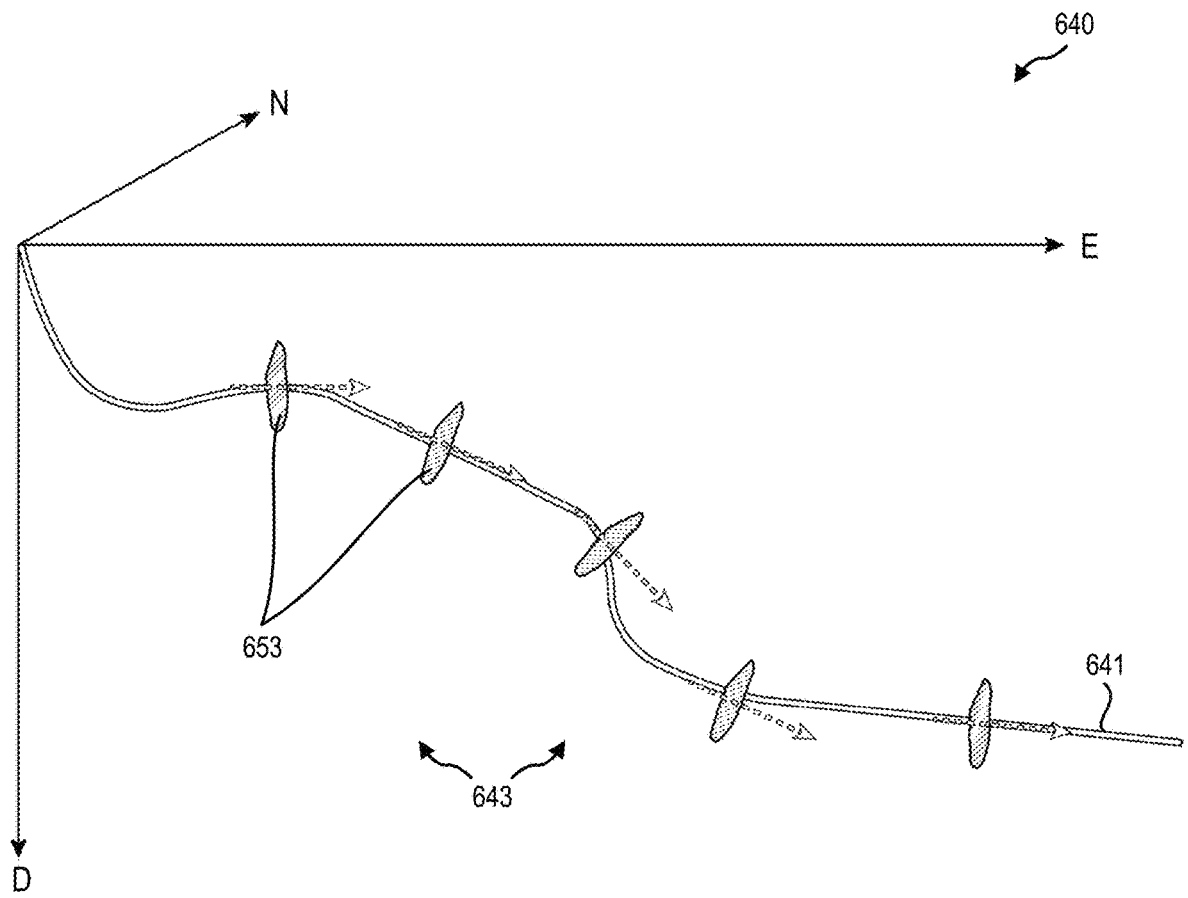
Figures 6, 7:
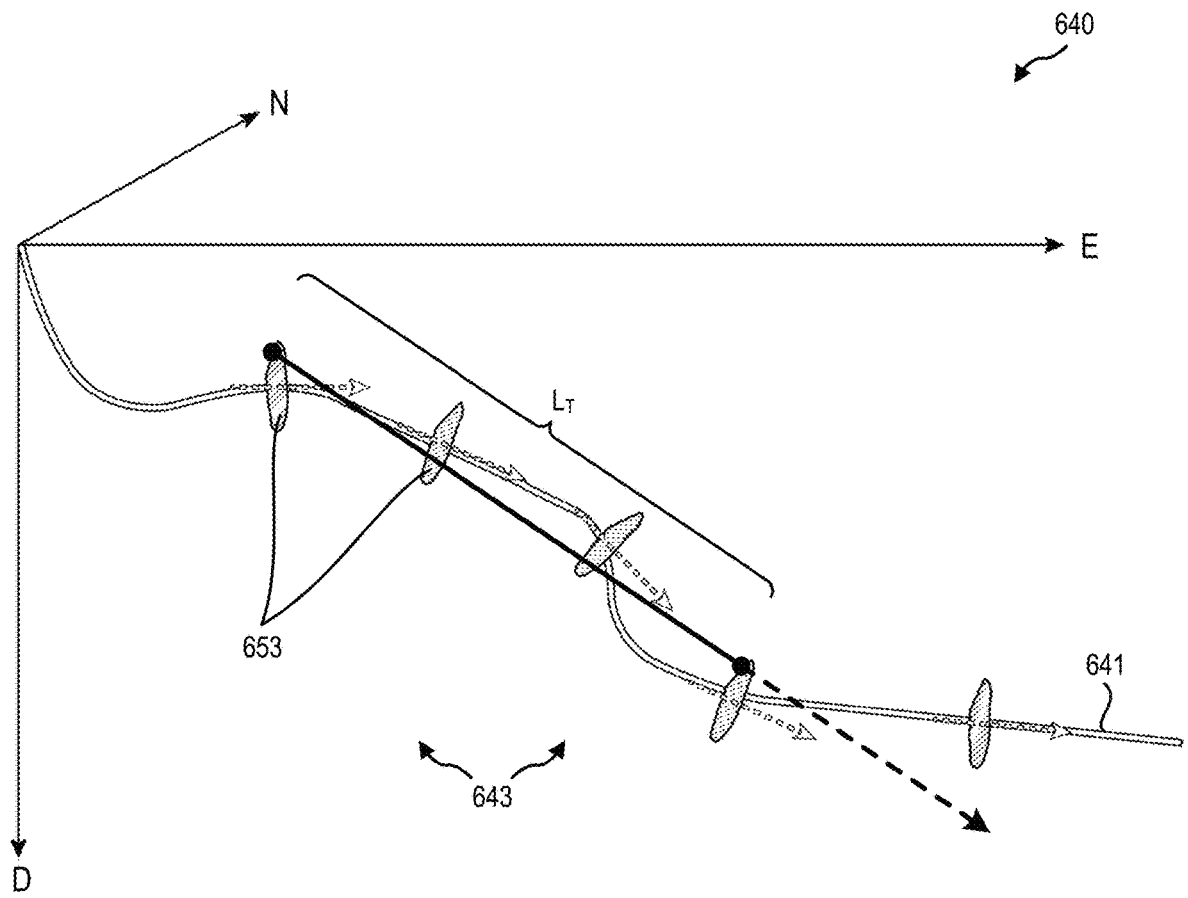
Figure 7:
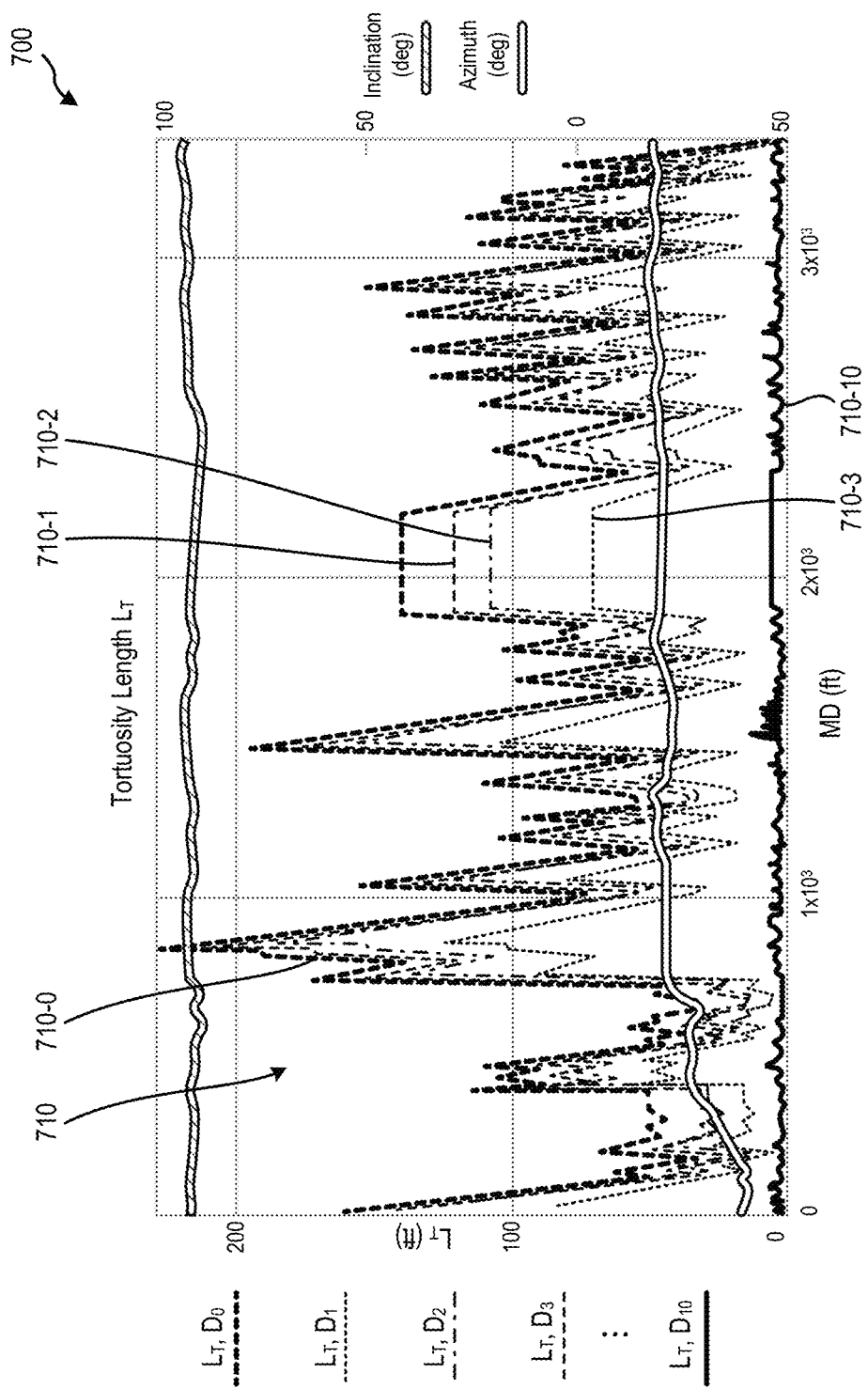

FIGS. 6-1 through 6-7 are various schematic representations illustrating features of the tortuosity engine 126 with respect to a wellbore cross-section 650, according to at least one embodiment of the present disclosure. As mentioned above, the wellbore data 132 may include wellbore shape data indicating a shape or form of the cross-section 650 of the wellbore at one or more measurement depths. In some embodiments, the tortuosity engine 126 incorporates the wellbore shape data into the determination and/or calculation of the tortuosity lengths $L_T$. For example, FIG. 6-1 shows an example cross-section 650 of the wellbore at a given MD. In some embodiments, the cross-section 650 is substantially circular. In some embodiments, the cross-section 650 is any other shape such as an irregular shape, as shown. The following discussion will be made with reference to a wellbore with an irregular-shaped cross-section 650, but it should be understood that the techniques discussed may apply equally to a circular (or any other-shaped) wellbore cross-section 650.

The tortuosity engine 126 may receive the shape of the wellbore cross-section 650 from the wellbore shape data. Based on the cross-section 650, the tortuosity engine 126 may simulate a plurality of tubular diameters 652 of a given reference diameter D around the perimeter 651 of the cross-section 650, as shown. The plurality of tubular reference diameters 652 in this way may represent the furthest extent (or boundary) in the cross-section 650 through which a simulated tubular of that reference diameter D may pass without contacting the wellbore wall 642 (e.g., a simulated contact 445 as discussed above). Based on the simulation of the plurality of tubular reference diameters 652, the tortuosity engine 126 may define a contact zone 653 as shown in FIG. 6-2. The contact zone 653 may be an enclosed area defined by the centers of the plurality of tubular reference diameters 652. The contact zone 653 may define the bounds of the area through which the centerline of a simulated tubular of reference diameter D may pass without the simulated tubular contacting the wellbore wall 642. In this way the tortuosity engine 126 may generate and/or define a boundary for a given cross-section 650 through which a simulated tubular may extend.

In some embodiments, the tortuosity engine 126 determines a plurality of contact zones 653 for a plurality of reference diameters D. For example, as shown in FIG. 6-3 the tortuosity engine 126 may simulate a plurality of tubular diameters 652 of a different reference diameter D (in this instance a larger reference diameter D) around the perimeter 651 of the cross-section 650 and may accordingly determine a contact zone 653 associated with the larger diameter D for the cross-section 650. As shown, larger reference diameters D may generally correspond with a smaller overall contact zone 653. The tortuosity engine 126 may determine contact zones 653 in this way for any number of reference diameters D and for any size of reference diameters D, consistent with that described herein. In some embodiments, the tortuosity engine 126 aggregates or assembles, for the cross-section 650, two or more (or all) of the determined contact zones for different reference diameters D of interest. For example, as shown in FIG. 6-4, the tortuosity engine 126 may determine a contact topography 654 for the cross-section, which may indicate two or more (or all) of the contact zones 653 of interest for the cross-section 650. As described herein, the contact topography 654 in this way may facilitate determining tortuosity metrics (e.g., tortuosity lengths) associated with one or more different reference diameters D of interest.

For example, as shown in FIG. 6-5, for each MD 643 of interest along a centerline 641 of a drill path 640, the tortuosity engine 126 and/or the drill path manager 124 may determine and associate a corresponding contact topography 654 for the specific cross-section 650 at the MD 643. The tortuosity engine 126 may incorporate the contact zones 653 and contact topographies 654 into the process described above (e.g., in connection with FIGS. 4-1-through 4-7) for determining the corresponding tortuosity lengths $L_T$. For example, based on a given tubular reference diameter of interest selected for determining an associated tortuosity length $L_T$ for the MDs 643, the tortuosity engine 126 may select a corresponding contact zone 653 at each MD 643 from each of the contact topographies 654, as shown in FIG. 6-6. The tortuosity engine 126 may implement the contact zones 653 as constraints for simulating extending the tubular through the various MDs 643 along the centerline of the wellbore, as discussed above. For example, as shown in FIG. 6-7, in determining whether a simulated tubular would encounter the wellbore wall 642, the tortuosity engine 126 may determine the furthest extent that a straight line (e.g., corresponding to the centerline of the associated simulated tubular) may pass through a series of the selected contact zones 653 at each MD 643. The tortuosity engine 126 may accordingly determine the length of the tubular passing through the contact zones 653 as the tortuosity length $L_T$ for the associated tubular reference diameter and at the specific MD 643. The tortuosity engine 126 may in this way account for the shape of the specific cross-section 650 at various MDs 643 for determining the simulated contacts with the wellbore wall as discussed above, based on constraining the simulation with the contact zones 653.

The tortuosity system 120 has been primarily described in connection with determining tortuosity lengths for various MDs 643 of a wellbore. It should be understood, however, that the same or similar techniques, determinations, calculations, formulas, etc. may additionally apply to the tortuosity system 120 determining one or more tortuosity reference diameters Dr as a tortuosity metric in addition to or as an alternative to the tortuosity length $L_T$. For example, whereas the tortuosity length $L_T$ may be a tortuosity metric defined by a maximum length that a stiff, straight tubular of a given (e.g., fixed) reference diameter may extend down the borehole from a given MD 643, the tortuosity reference diameter $D_T$ may be a similar metric, but may be defined as a maximum reference diameter that a stiff, straight tubular of a given (e.g., fixed) length may extend down the borehole from a given MD 643. The tortuosity reference diameter may be determined by implementing similar techniques as that discussed above. By way of example, a few illustrative examples will be given.

FIGS. 4-1 through 4-7 have been shown and described with respect to extending a simulated tubular of a given reference diameter along a centerline of a borehole from a first MD to one or more subsequent MDs until a simulated contact is detected of the tubular with the borehole wall. As mentioned, this process may be iterated for tubulars of various reference diameters to determine tortuosity lengths $L_T$ associated with several reference diameters of interest. A similar process may be implemented for determining a tortuosity diameter $D_T$. The tortuosity diameter $D_T$ may represent the maximum diameter of a straight tubular that will enable the tubular to extend a reference length from a measurement depth and down through the wellbore without bending. For example, the tortuosity engine 126 may simulate extending a tubular of a given reference length from a first MD down the borehole, and the tortuosity engine 126 may simulate increasing the diameter (e.g., incrementally) until a simulated contact is determined for the tubular with the borehole wall. This diameter at which the simulated contact is detected may be determined to be the tortuosity diameter $D_T$ for the associated MD and for the associated reference length. Additionally, this process may be iterated for one or more tubulars of various reference lengths to determine tortuosity diameters Dr of several reference lengths of interest.

The techniques shown and described herein in connection with FIGS. 6-1 through 6-7 could additionally be implemented in connection with the processes for determining the tortuosity diameters $D_T$. For example, as described herein, the tortuosity engine 126 may determine the contact zones and contact topographies (e.g., for various diameters) for each MD of interest and may accordingly implement the contact topographies and contact zones for determining the tortuosity reference diameter $D_T$ associated with one or more lengths of interest for each MD. The tortuosity engine 126 may simulate extending (e.g., the centerline of) a tubular of a reference length through several consecutive MDs, and through the associated contact topographies. The tortuosity engine 126 may apply the contact zones of a, e.g., smallest reference diameter to the simulated tubular and may determine whether the simulated tubular breaches one or more of the contact zones. The tortuosity engine 126 may accordingly iteratively apply the contact zones associated with increasingly larger tubular diameters until it is determined that the simulated tubular will breach one or more of the contact zones. The largest associated diameter for the set of contact zones in which the simulated tubular will not breach may accordingly be determined to be the tortuosity diameter $D_T$ for the corresponding MD and for the corresponding reference length. This process may be iterated for one or more tubulars of various reference lengths to determine tortuosity diameters $D_T$ of several reference lengths of interest. In this way, the tortuosity system 120 may implement the techniques described herein in similar manners in order to determine tortuosity metrics including a tortuosity length $L_T$ and a tortuosity reference diameter $D_T$ for characterizing and/or quantifying the tortuosity of a wellbore.

As mentioned above, the tortuosity system 120 includes a report manager 128. The report manager 128 may generate one or more reports associated with the calculations and/or determinations of, for example, the drill path manager 124 and/or the tortuosity engine 126. FIG. 7 illustrates an example plot 700 generated by the report manager 128. In some embodiments, the plot 700 illustrates one or more tortuosity lengths $L_T$ for one or more MDs. For example, the plot 700 may include one or more curves 710 corresponding with one or more reference diameters of a simulated tubular. The curves 710 may be defined by the determined tortuosity lengths for each reference diameter at each evaluated MD. The curves 710 may include a minimum curve 710-0 corresponding with a reference diameter of 0, and a maximum curve 710-10 corresponding with a reference diameter of just less than the gauge diameter of the wellbore, as discussed herein. The curves 710 may include one or more intermediate curves such as a first curve 710-1, a second curve 710-2 and a third curve 710-3, which may each correspond to a reference diameter of intermediate sizes, for example, between the minimum and maximum reference diameters. In some embodiments, the plot 700 includes only one curve for one reference diameter of interest. In some embodiments, the plot 700 includes several (or all) curves for the tortuosity lengths $L_T$ determined for several different reference diameters. The plot 700 may include any number of curves 710 (e.g., in addition to that shown in FIG. 7) for any number of reference diameters.

In some embodiments, the plot 700 illustrates one or more tortuosity diameters $D_T$ for one or more MDs. For example, the curves 710 may correspond to simulated tubular of one or more reference lengths, and the curves 710 may be defined by the determined tortuosity diameters Dr for each reference length at each evaluated MD. The minimum curve 710-0 may correspond to a reference length of 0 (e.g., in which the corresponding tortuosity reference diameter $D_T$ would be a gauge diameter of the wellbore, or other maximum constraint value). The maximum curve 710-10 may correspond to a reference length of the length of the wellbore, maximum tortuosity length $L_T$, or any other maximum constraint value. The intermediate curves 710-1, 710-2, and 710-3 may accordingly correspond to intermediate reference lengths between the minimum and maximum reference lengths. The plot 700 may include any number of curves for representing any number of tortuosity diameters $D_T$ for an evaluated MD.

In some embodiments, the plot 700 includes a representation of the associated survey data upon which the tortuosity length and/or tortuosity reference diameter determinations were made. For example, the plot 700 may represent the inclination and/or azimuth at each MD. The plot 700 may include any other information relevant to the wellbore and/or to characterizing the tortuosity, consistent with that discussed herein. In some embodiments, the report manager 128 generates a plurality of plots illustrating any combinations and/or permutations of the information shown and/or described in connection with any of the plots described herein. In this way, the report manager 128 may present the information determined by the tortuosity system 120. For example, the report manager 128 may present the plot 700 via a graphical user interface (GUI) to a user or operator. The report manager 128 may store the plot 700 to the data storage 130 as report data 138.

The tortuosity system 120 in this way may facilitate one or more of generating, calculating, or presenting advantageous information regarding the tortuosity of wellbores. For example, in many cases, it may be challenging to one or more of describe, characterize, or quantify the tortuosity of wellbores in a way that is accurate, intuitive, useful, etc.

Indeed, it may be difficult to conceptualize and/or visualize the tortuosity of a wellbore in a meaningful way, for example, by analyzing the survey data. Additionally, in many cases, different parties may conventionally characterize and/or quantify tortuosity in many unique, non-standard ways. The techniques according to the present disclosure present a simple, easy-to-digest way of envisioning tortuosity that makes useful information readily available to users/operators of a downhole system. For example, by relating tortuosity to a series of maximum straight lengths, or tortuosity lengths $L_T$, it can be easy to understand the relative "straightness" of various sections of a wellbore. Indeed, by presenting the tortuosity lengths $L_T$, on a plot with respect to MD, associated "straight" sections and "curved" sections (for example) of the wellbore are easily identifiable. Further, associating the tortuosity lengths $L_T$ with specific tubular reference diameters can facilitate understanding the relationship between the wellbore and specific downhole tools that may be implemented downhole (e.g., whether a specific tool of a specific length and reference diameter will pass through one or more sections of the wellbore).

The tortuosity metrics described herein may be advantageous over conventional ways of characterizing and quantifying tortuosity. For example, in many cases wellbore tortuosity may conventionally be described with relation to bends or doglegs in the wellbore and an associated severity. These measures, however, may be misleading, as they only quantify the tortuosity with respect to the extent to which the wellbore bends. The present techniques, however, classify the tortuosity from the perspective of a tubular (with a diameter of interest) implemented in the wellbore, which gives an advantageous insight on whether the severity of the bends in the wellbore are significant to the tubulars of interest that may be implemented in the wellbore. For example, a given section of a wellbore may be classified as having a certain degree of dogleg according to conventional techniques. However, considering the diameter of interest of a given tubular, the wellbore may nevertheless exhibit a straight path for that tubular despite the dogleg in that section of the wellbore. The tortuosity metrics of the present disclosure may capture and quantify this effect that conventional methods fail to consider.

Establishing specific metrics that characterize and quantify tortuosity in an objective, measurable way may also facilitate comparing the tortuosity of multiple wellbores, or even comparing multiple portions of a same wellbore. For example, a plot illustrating the tortuosity lengths $L_T$ may clearly and easily identify certain wellbores, or certain sections of a same wellbore that exhibit more straightness than others. This may facilitate understanding or determining where to implement certain downhole tools that may have certain length and/or diameter constrained straightness requirements, such as electrical submersible pumps (ESP).

Additionally, the tortuosity metrics described herein may be determined based on limited and/or routine wellbore information. For example, the tortuosity system 120 may determine the one or more of tortuosity length, tortuosity reference diameter, or cumulative tortuosity angle (described below) based only on the azimuth and inclination measurements. This survey data may in many cases be gathered in the typical course of drilling and as such the techniques described herein may be implemented without the need for taking dedicated measurements and/or implementing specialized equipment.

Further, the tortuosity system 120 determining the tortuosity metrics described herein may facilitate understanding the relationship between tortuosity and certain downhole tools and/or certain drilling parameters, or how these tools/parameters affect tortuosity. For example, the tortuosity metrics described herein may be determined and monitored (e.g., in real time) in connection with the drilling parameters. By comparing this data, the tortuosity system 120 may facilitate determining which drilling parameters (or combinations of parameters) cause or result in larger (or smaller) tortuosity lengths/diameters. Similarly, an operation of a downhole tool or a type of downhole tool may be incorporated to understand the resultant tortuosity response from that tool and/or operation (both alone and in combination with the drilling parameter information). In this way, the tortuosity system 120 determining the tortuosity metrics may facilitate understanding how the operation of the downhole system creates or results in tortuosity, for example, in order to operate the downhole system in such a way so as to reduce or minimize tortuosity.

In some embodiments, the tortuosity metrics described herein may be useful for performing finite element analysis FEA with respect to one or more aspects, or one or more downhole tools, of the downhole system. For example, the tortuosity metrics may facilitate identifying one or more sections of the wellbore where one or more portions of the drill string may be subject to increased levels of bending due to the wellbore geometry. Accordingly, the drill string may be modeled via FEA with respect to that portion of the drill string in order to understand the stress, strain, etc., that the drill string might experience at that location of the wellbore. In another example, the tortuosity metrics, such as the tortuosity lengths, determined for the wellbore may serve as bounds or limits for the size and/or shape of the wellbore for performing FEA modeling of the drill string. Multiple FEA iterations may be performed using multiple wellbore shapes and/or sizes based on the tortuosity metrics.

In some embodiments, the tortuosity metrics determined by the tortuosity system 120 facilitates planning for one or more objectives and/or operations associated with a wellbore. For example, the features and functionalities of the tortuosity system 120 may be implemented based on a planned trajectory for a wellbore (e.g., in contrast to survey data taken during drilling of a wellbore) to determine tortuosity metrics associated with the planned trajectory. A drilling plan may identify one or more downhole tools for implementing at or past one or more MDs of the wellbore. These tools may have specific lengths and/or reference diameters. Accordingly, a trajectory for the wellbore may be planned or altered in order to advantageously implement a specific tortuosity length $L_T$ and/or tortuosity reference diameter $D_T$ at one or more designated MDs such that these tools may easily pass through one or more sections of the wellbore, or such that these tools may be implemented at a specific location in the wellbore. As an example, it may be advantageous to implement an ESP in a relatively long and/or straight section of the wellbore. The wellbore may accordingly be planned such that the tortuosity length $L_T$ for the corresponding MDs may accommodate the ESP. Similarly, a planning phase of the wellbore may include determining which downhole tools to implement at or through one or more sections of the wellbore. The tortuosity metrics described herein may facilitate selecting which tools to implement in the wellbore by analyzing the tortuosity metrics determined by the tortuosity system 120, based on an associated length and/or diameter of the downhole tools. This may be especially advantageous in situations where it may be difficult to plan, change, or alter the trajectory of the wellbore to maintain a (e.g., minimum) threshold tortuosity length.

In some embodiments, the tortuosity system 120 receives the survey data (and/or any other data) in real time and during drilling of the wellbore. Based on the real-time data, the tortuosity system 120 may determine one or more of the tortuosity metrics described herein and/or may generate and present a (e.g., live updated) plot illustrating one or more of these metrics. In this way, the tortuosity system 120 may facilitate a real-time understanding of the tortuosity at the current MD of the downhole system. In some embodiments, this facilitates a user making one or more adjustments to the operation of the downhole system. For example, a drill plan for the wellbore may dictate one or more tortuosity length requirements for one or more MDs, such as to facilitate implementing a specific downhole tool at or past one or more MDs. While drilling, and based on the active tortuosity determinations of the tortuosity system 120, a drilling engineer may adjust one or more drilling parameters in order to meet these requirements. For example, the drilling engineer may adjust a rate of penetration, weight on bit, RPM, or any other parameter of a downhole tool in order to control the tortuosity response of the downhole system. In another example, the drilling engineer may adjust the steering of a downhole tool in order to maintain the tortuosity metrics within a threshold.

The techniques described herein have thus far been described with respect to determining tortuosity metrics for wellbore tortuosity generally, or for tortuosity due to any factor. In some embodiments, multiple factors play a role in creating wellbore tortuosity. For example, the wellbore plan may necessarily result in a certain amount of tortuosity due to the steering of the wellbore one or more of toward, through, or around underground features. In another example, the drilling parameters, such as rate of penetration and/or the drilling tools implemented when drilling the wellbore may cause the wellbore to depart from the drilling plan or planned trajectory, resulting in tortuosity. In some embodiments, it may be desirable to isolate different types of tortuosity, or tortuosity resultant from different factors, in order to conceptualize in isolation the tortuosity.

As mentioned above, the drill path manager 124 may receive the wellbore data 132 (e.g., the survey data) and may perform one or more calculations and/or determinations, such as determining a drill path, centerline, etc., to facilitate one or more functions of the tortuosity system 120 described herein. In some embodiments, the drill path manager 124 smooths the survey data. For example, for each MD, the drill path manager 124 may determine an azimuth and/or inclination for that MD based on implementing a statistical calculation of the azimuths and/or inclinations of MDs within a threshold distance or within number of samples from the MD. For example, the drill path manager 124 may determine a mean, median, mode, average, quartile, standard deviation, or any other relevant calculation of a local range of azimuths and/or inclinations (respectively) for that MD. The drill path manager 124 may determine the statistical calculations using the survey data for MDs within a threshold distance in the wellbore, such as a threshold distance of 5 ft, 10 ft, 50 ft, 100 ft, 200 ft, 500 ft, or any other distance before, after, or nearest the MD of interest. The drill path manager 124 may determine the statistical calculations using the survey data for MDs within a threshold number of samples, such as the 5, 10, 20, 50, or 100 samples sequentially before, after, or nearest the MD of interest. In this way, the drill path manager 124 may smooth the survey data, which may facilitate eliminating or smoothing measurement errors, outliers, transients, etc.

Figure 8:
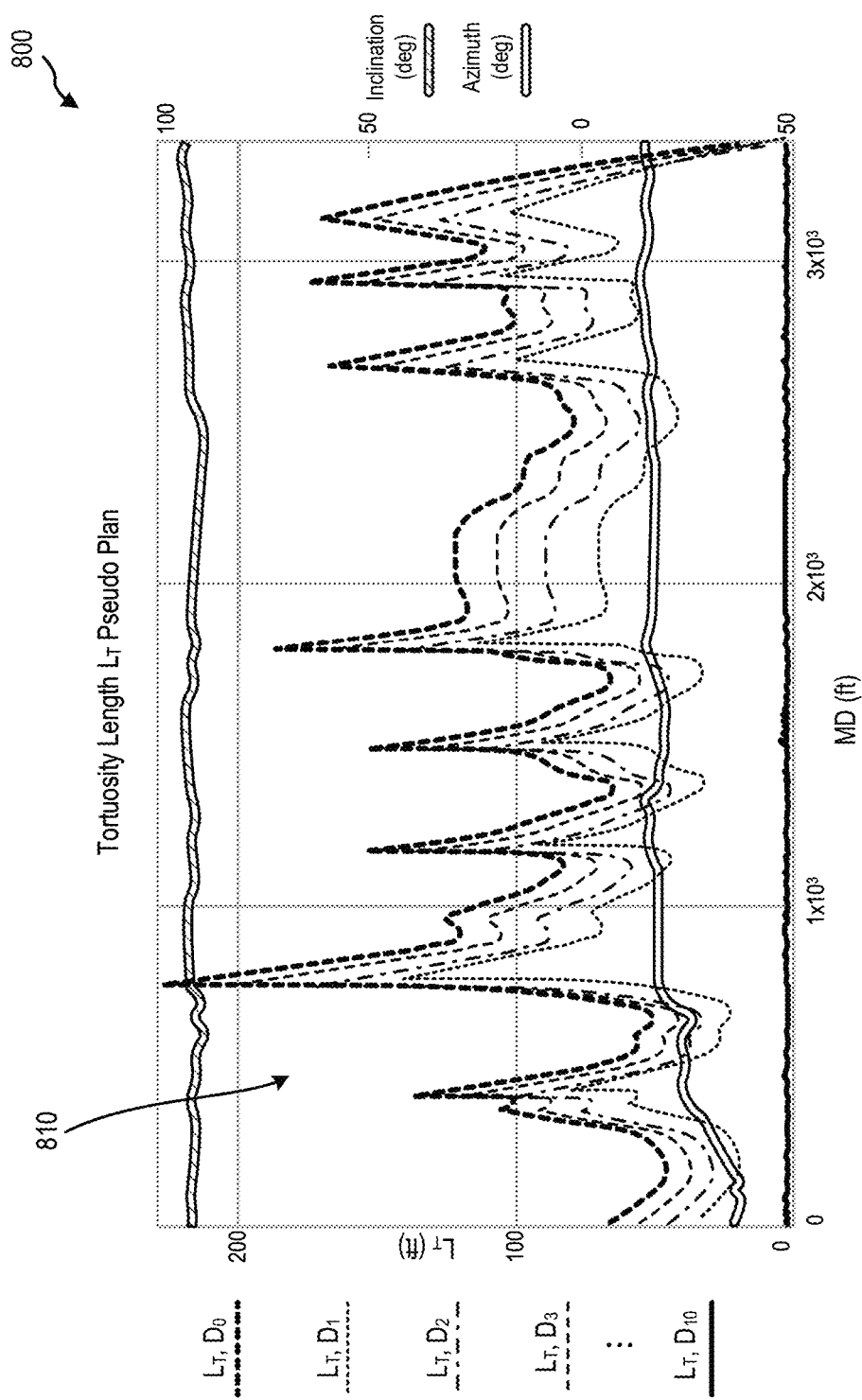
FIG. 8 illustrates an example plot generated by a report manager, according to at least one embodiment of the present disclosure.

FIG. 8 illustrates an example plot 800 generated by the report manager 128, according to at least one embodiment of the present disclosure. The plot 800 may be generated based on data smoothed by the drill path manager 124. The curves 810 may correspond to tortuosity lengths $L_T$ of associated reference diameters, or may correspond to tortuosity depths $D_T$ of associated reference lengths. The curves 810 may correspond to the curves 710 of the plot 700 of FIG. 7. As can be seen, the curves 810 may exhibit the same general shape, form, trend, etc., as the curves 710 of the plot 700 of FIG. 7, but may be substantially smoothed. For example, as shown, the curves 810 may exhibit some of the same larger or global peaks and valleys, but may not exhibit some of the smaller, stochastic peaks and valleys and/or local maxima and minima that the curves 710 have. In some embodiments, one or more of these smaller, local, jagged, or stochastic features (e.g., exhibited in the plot 700 but not in the plot 800) are resultant from tortuosity associated with drilling tools and/or drilling parameters implemented when drilling the wellbore (e.g., tools twitching or wandering as they struggle through the formation). In this way, the smoothed data, and the plot 800, may be a representation of the isolated tortuosity of the planned trajectory of the wellbore alone, and may not account for tortuosity due to tool/drilling parameter response. For example, as can be seen, the curves 810 of the plot 800 may generally have higher peaks (e.g., longer tortuosity lengths $L_T$) than the curves 710 of the plot 700 of FIG. 7. In this way, the smoothed data and the plot 800 may be representative of a pseudo planned wellbore trajectory, and may facilitate characterizing and conceptualizing the tortuosity inherent in the wellbore plan. Isolating the tortuosity of the wellbore plan itself may facilitate understanding, for example, a minimum amount of tortuosity that may occur at a specific section of the wellbore. Accordingly, a specific downhole tool or operation thereof is unlikely to improve on this inherent tortuosity without deviating from the wellbore plan. Additionally, in some embodiments, the tortuosity system 120 performs the features and functionalities described herein by utilizing the actual planned trajectory, for example, instead of deriving the pseudo plan from the survey data. The report manager 128 may store the plot 800 to the data storage 130 as report data 138.

In addition to being able to determine and/or quantify the tortuosity of the wellbore for various MDs generally, in some embodiments, the techniques discussed herein facilitates determining information about the specific downhole tool implemented to drill the wellbore. For example, the tortuosity system 120 may determine and/or analyze a tool fingerprint of a downhole tool of the downhole system associated with one or more measurement depths. The tool fingerprint may facilitate identifying a type of downhole tool implemented to drill the wellbore at one or more MDs. The tool fingerprint may facilitate identifying a type of operation executed by a downhole tool to drill the wellbore at one or more MDs.

Figure 9:
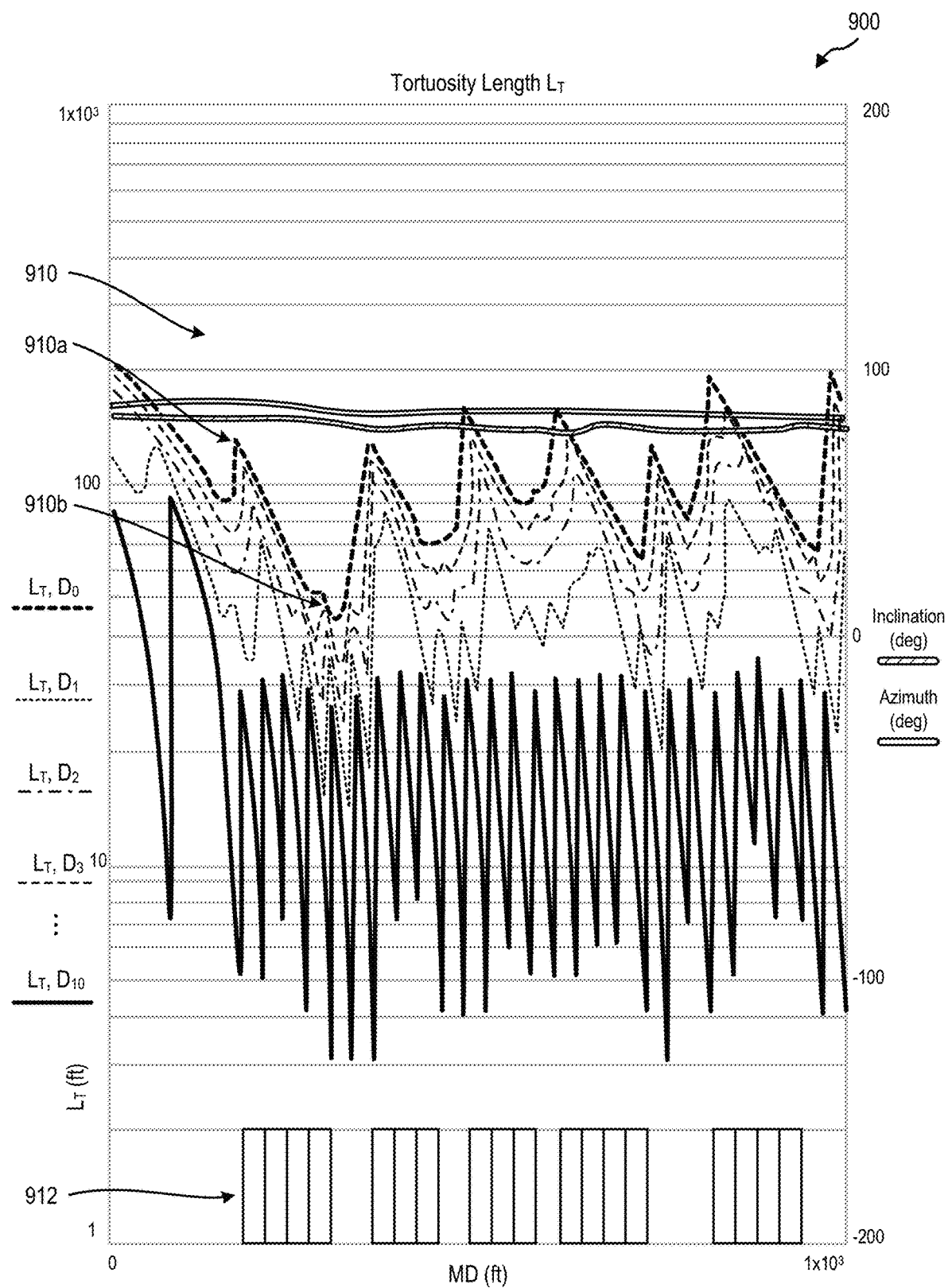
FIG. 9 illustrates an example plot generated by a report manager, according to at least one embodiment of the present disclosure.

FIG. 9 is an example plot 900 generated by the report manager 128, according to at least one embodiment of the present disclosure. The plot 900 may illustrate various curves 910 associated with one or more of the tortuosity metrics described herein, such as that described in connection with FIGS. 7 and/or 8. The plot 900 may illustrate the determined tortuosity length $L_T$ for each MD, and the plot 900 may include any of the features of the plots discussed herein, for example, in addition to or as an alternative to the tortuosity lengths $L_T$. As shown in FIG. 9 the tortuosity length $L_T$ of the associated curves 910 may exhibit certain data features, such as (e.g., local) peaks 910a and (e.g., local) valleys 910b. In some embodiments, the tortuosity engine 126 identifies data features such as these as tool fingerprints. For example, as shown, the plot 900 illustrates a tool sequence 912. The plot 900 (and associated data) may correspond with a wellbore drilled while implementing a downhole mud motor, and the tool sequence 912 may correspond with a sequency of turning/slide instances of the mud motor (and corresponding no turning/slide instances or rotate instance of the mud motor). The tortuosity engine 126 may identify the tool fingerprints as corresponding to the tool sequence 912. For example, the slide instance(s) of the mud motor may correspond with a (e.g., sudden or abrupt) dip or downturn in the tortuosity length $L_T$ (e.g., corresponding with the tortuosity lengths $L_T$ decreasing based on the wellbore turning). Similarly, the instances of no slide, or rotate instances, may correspond with a (e.g., sudden or abrupt) rise or upturn in the tortuosity length $L_T$ (e.g., corresponding with the tortuosity lengths $L_T$ increasing based on the wellbore proceeding straight). In this way, the tortuosity engine 126 may identify tool fingerprint(s) in order to facilitate identifying the tool sequence 912 (e.g., without previously knowing the associated tool sequence).

The tortuosity engine 126 may identify data features as tool fingerprints for any number of features associated with the wellbore. For example, the tortuosity engine 126 may identify tool fingerprints that may identify or characterize any operation of a downhole tool, such as the tool sequence 912 described above. In another example, the tortuosity engine 126 may identify tool fingerprints that may identify a type of downhole tool, such as whether the borehole was steered using a mud motor or an RSS. In another example, the tortuosity engine 126 may identify tool fingerprints that may identify whether a specific downhole tool is operating correctly, or whether the tool is damaged, worn, failing, or otherwise dysfunctional. The report manager 128 may store the plot 900 to the data storage 130 as report data 138.

Figure 10:
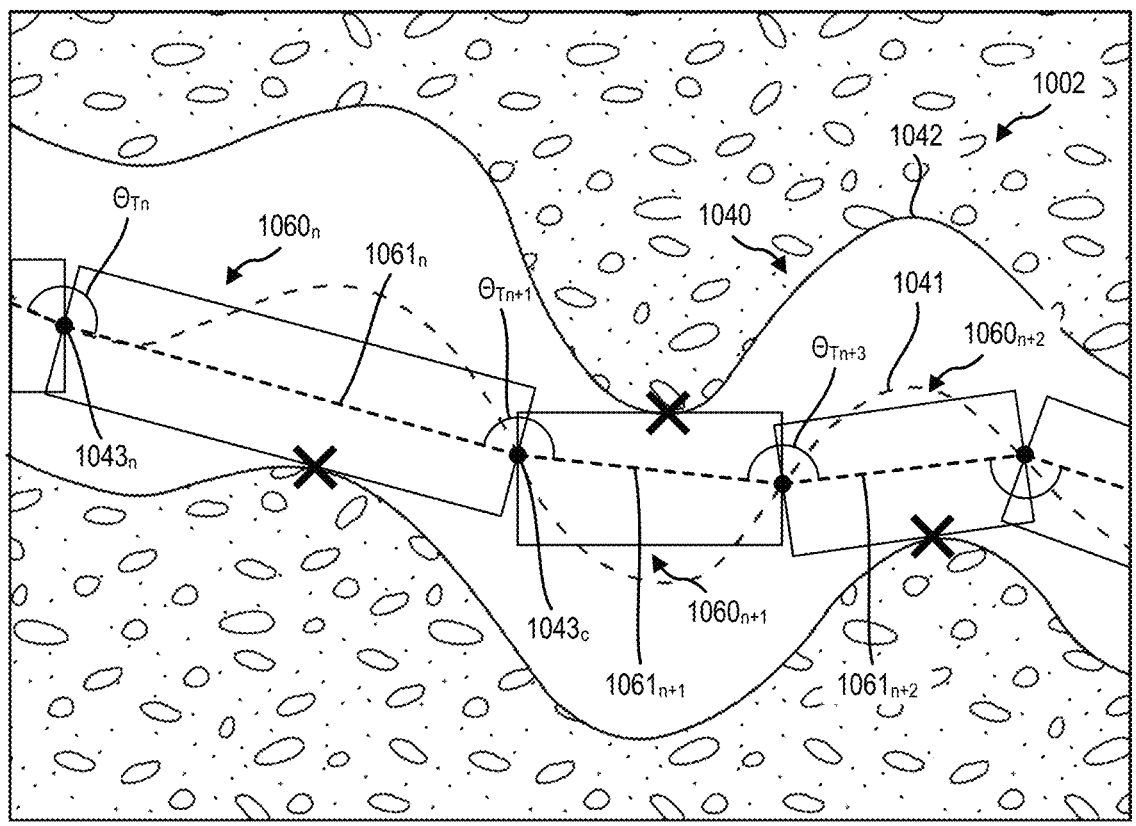
FIG. 10 is a representation of a wellbore including various schematic representations illustrating features of the tortuosity system, according to at least one embodiment of the present disclosure.

FIG. 10 is a representation of the wellbore 1002 including various schematic representations illustrating features of the tortuosity system 120, according to at least one embodiment of the present disclosure. As mentioned above, the drill path manager 124 may receive the wellbore data 132 (e.g., the survey data) and may perform one or more calculations and/or determinations related to the wellbore 1002, such as determining a drill path 1040, including a centerline 1041, wellbore wall 1042, etc.

In some embodiments, the tortuosity system 120 determines a cumulative tortuosity angle $\theta_C$ for one or more MDs of the wellbore 1002. The cumulative tortuosity angle $\theta_C$ may be a tortuosity metric associated with an overall, or increasing tortuosity for the wellbore 1002 with an increase in the MD. For example, the cumulative tortuosity angle $\theta_C$ for a given MD may be cumulative of the totality of the angle or degree of tortuosity of the wellbore 1002 above that MD. The cumulative tortuosity angle $\theta_C$ may be associated with a specific reference diameter of interest.

In some embodiments, the tortuosity engine 126 segments the wellbore 1002 into a plurality of segments 1060. The tortuosity engine 126 may determine or define the segments 1060 by implementing the techniques described above for determining tortuosity lengths $L_T$ for MDs in the wellbore 1002. For example, beginning at a first MD $1043_n$, the tortuosity engine 126 may define a first segment 1060n by determining a tortuosity length $L_T$ associated with a specific reference diameter, extending downhole from the first MD $1043_n$ to a critical MD $1043_c$. The tortuosity engine 126 may define a second segment $1060_{n+1}$, a third segment $1060_{n+2}$, and so on by determining a tortuosity length $L_T$ for each segment extending from the end, or critical MD, of the respective previous segment. In this way, the segments 1060 of the wellbore may be defined by a plurality of linked or chained tortuosity lengths $L_T$.

In some embodiments, the tortuosity engine 126 defines a tortuosity vector 1061 ($1061_n$, $1061_{n+1}$, $1061_{n+2}$, etc.) for each segment 1060. For example, each tortuosity vector 1061 may have a length defined by the tortuosity length $L_T$ determined for the associated segment 1060. Each tortuosity vector 1061 may also have a tortuosity angle $\theta_T$ ($\theta_{Tn}$, $\theta_{Tn+1}$, $\theta_{Tn+2}$, etc.) defined by an angle between the tortuosity vector 1061 and an adjacent tortuosity vector immediately uphole. Alternatively, the tortuosity angle $\theta_T$ may be defined by an angle between the tortuosity vector 1061 and a reference direction or reference line, such as an angle from vertical, angle from horizontal, angle from a line tangent to the centerline 1041, or any other angle useful for characterizing the tortuosity and consistent with that described herein. In this way, the wellbore 1002 may be represented as a series of adjacent tortuosity vectors 1061 linked or chained from the surface (or from any other MD), down to any MD of interest.

The tortuosity engine 126 may determine the cumulative tortuosity angle $\theta_C$ based on the tortuosity vectors 1061 for each segment 1060. For example, the tortuosity engine 126 may determine a cumulative tortuosity angle $\theta_C$ for each segment 1060 by summing (e.g., the absolute value of) the tortuosity angle $\theta_T$ for the segment 1060 with the cumulative tortuosity angle $\theta_C$ of the previous (uphole) segment 1060. In this way, a segment's associated cumulative tortuosity angle $\theta_C$ may represent the summation of the tortuosity angle $\theta_T$ for that segment 1060 with all the tortuosity angles $\theta_T$ for all previous, or uphole segments 1060. In some embodiments, the tortuosity engine 126 associates one or more MDs with each segment 1060. For example, a MD occurring at the start or end of a segment 1060 may be associated with the segment 1060 downhole of the MD, uphole of the MD, or both. MDs falling within a segment 1060 may be associated with that segment 1060. Thus, each MD may be associated with a cumulative tortuosity angle $\theta_C$ corresponding to an associated segment containing the MD. In this way, the tortuosity engine 126 may determine a set of cumulative tortuosity angles $\theta_C$ for the plurality of MDs of the wellbore 1002.

In some embodiments, the tortuosity engine 126 determines a plurality of sets of cumulative tortuosity angles $\theta_C$. For example, the tortuosity engine 126 may determine a set of cumulative tortuosity angles $\theta_C$ for the MDs of the wellbore based on survey data, and may determine another set of cumulative tortuosity angles $\theta_C$ for the MDs of the same wellbore based on smoothed survey data for the same wellbore. In another example, the tortuosity engine 126 may determine a set of cumulative tortuosity angles $\theta_C$ for the MDs of a wellbore and may determine another set of cumulative tortuosity angles $\theta_C$ for the (same or similar) MDs of another wellbore. In another example, the tortuosity engine 126 may determine a plurality of sets of cumulative tortuosity angles $\theta_C$ for a plurality of reference diameters for the MDs of one or more wellbores.

Figure 11:
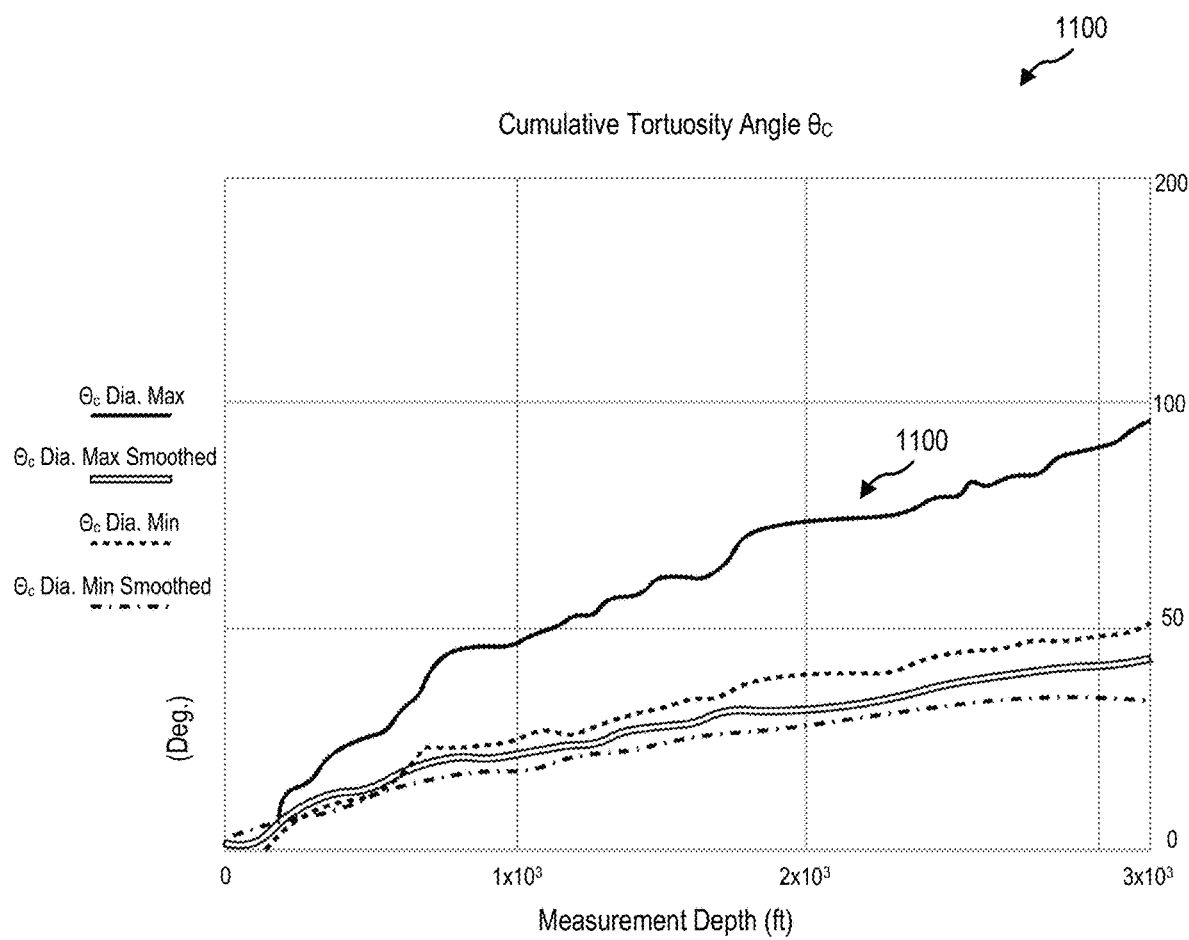
FIG. 11 illustrates an example plot generated by a report manager, according to at least one embodiment of the present disclosure.

In some embodiments, the report manager 128 plots one or more sets of cumulative tortuosity angles $\theta_C$ for one or more MDs of the wellbore 1002. For example, FIG. 11 is an example plot 1100 generated by the report manager 128, according to at least one embodiment of the present disclosure. The plot 1100 may include one or more curves 1110 associated with one or more sets of cumulative tortuosity angles $\theta_C$ for the MDs of one or more wellbores. The cumulative tortuosity angle $\theta_C$ in this way may facilitate characterizing and/or quantifying the tortuosity of a wellbore, especially when compared across several relevant cumulative tortuosity angles $\theta_C$. For example, the values of the cumulative tortuosity angle $\theta_C$ may be compared at a same MD for two or more wellbores, or for two or more reference diameters to easily compare the straightness over the entire course of the wellbore up to that MD. Similarly, the (e.g., local) slope of the curves 1110 at or around a specific MD may indicate the straightness of the wellbore at or near that MD. As shown, the cumulative tortuosity angle $\theta_C$ grows faster for a maximum associated reference diameter, as compared to a minimum associated diameter. This is consistent with larger reference diameters being associated with generally smaller tortuosity lengths, as described herein, resulting in the tortuosity engine 126 defining more segments and summing more tortuosity angles $\theta_T$ for the wellbore. Similarly, as shown, the cumulative tortuosity angle $\theta_C$ is generally smaller for the smoothed data, because, as described above, the smooth data results in generally longer tortuosity lengths. In this way, the cumulative tortuosity angle $\theta_C$ may even further simplify comparing straightness (overall and local) between wellbores and/or between specific reference diameter constraints.

The cumulative tortuosity angle $\theta_C$ may additionally facilitate characterizing and/or representing a number of contact points for a tubular of interest with the wellbore wall. For example, a larger cumulative tortuosity angle $\theta_C$ may be associated with a larger amount of adjacent segments simulated in the wellbore. Given that each segment is determined based on a simulated contact of a tortuosity vector with the wellbore, a larger cumulative tortuosity angle $\theta_C$ may therefore also be associated with a larger number of contact points of the relevant tubular with the wellbore wall, and additionally a number of instances where the tubular is very close to the wellbore wall. This may be especially relevant, for example, for situations of implementing casing in the wellbore for cementing in place. In many cases, the clearance between casing and the wellbore may be critically important for the integrity of the cementing of the casing to the wellbore. If the gap is too small or just touching the wellbore, the effectiveness of the cement may be compromised, and fluid may be allowed to pass from outside of the casing. This may adversely affect the ability of the casing to isolate different portions of the wellbore and/or formation, which can lead to serious consequences. Thus, the cumulative tortuosity angle $\theta_C$ may facilitate understanding the spatial distribution of contact points and small casing gaps/clearances in order to identify cementing defects.

The plot 1100 may include any of the features of the plots described herein. For example, the plot 1100 may indicate any of the underlying data (e.g., azimuth and/or inclination) associated with the cumulative tortuosity angles $\theta_C$. In some embodiments, the tortuosity system 120 determines the cumulative tortuosity angles $\theta_C$ (and any associated metrics or intermediate calculations) and/or generates the plot 1100 in real time. In this way, the tortuosity system 120 may facilitate characterizing and conceptualizing the tortuosity of the wellbore at the present MD through the cumulative tortuosity angle $\theta_C$. This may facilitate a user, for example, making informed decisions and/or adjusting one or more drilling parameters based on maintaining the value (or slope) of the cumulative tortuosity angle $\theta_C$ within a certain threshold. The report manager 128 may store the plot 1100 to the data storage 130 as report data 138.

Figure 12:
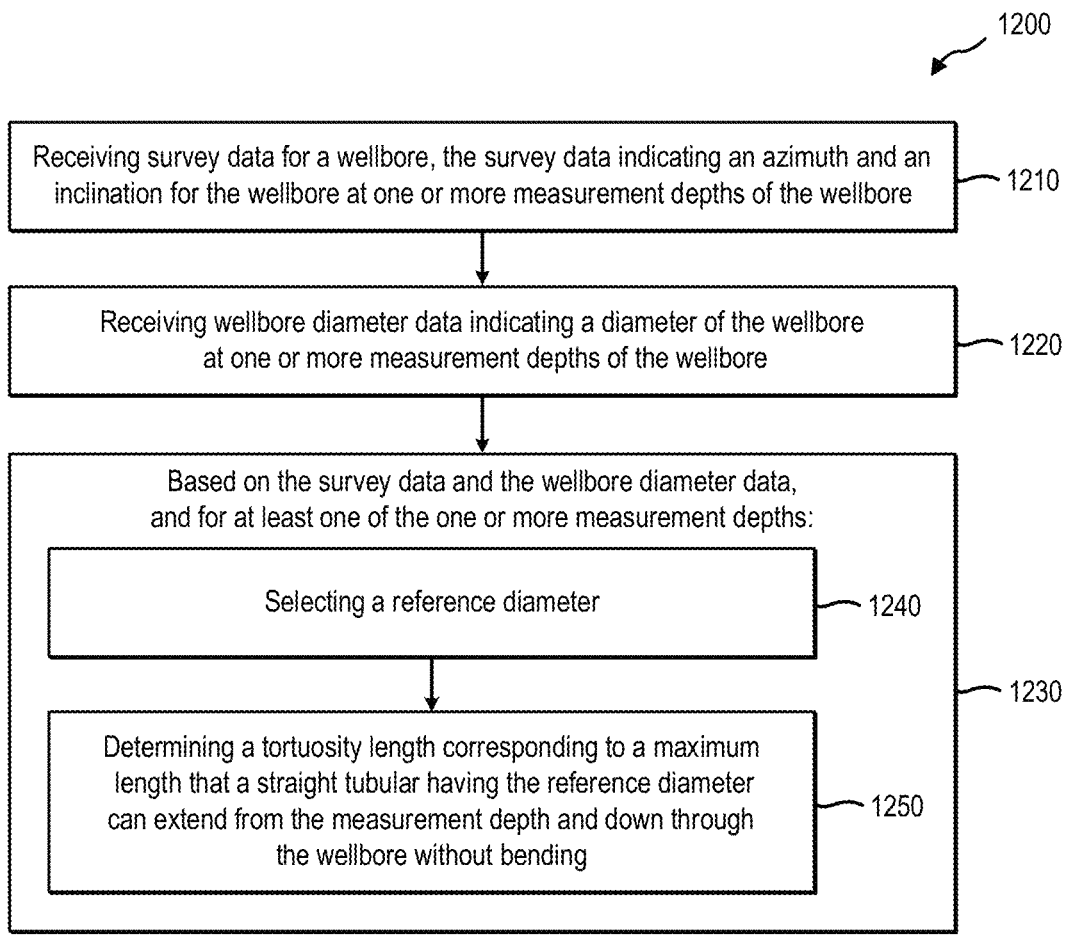
FIG. 12 illustrates a flow diagram for a method or a series of acts for quantifying tortuosity of a wellbore as described herein, according to at least one embodiment of the present disclosure.

FIG. 12 illustrates a flow diagram for a method 1200 or a series of acts for quantifying tortuosity of a wellbore as described herein, according to at least one embodiment of the present disclosure. While FIG. 12 illustrates acts according to one embodiment, alternative embodiments may add to, omit, reorder, or modify any of the acts of FIG. 12.

In some embodiments, the method 1200 includes an act 1210 of receiving survey data for the wellbore. The survey data may indicate an azimuth and inclination for the wellbore at one or more measurement depths of the wellbore. In some embodiments, the survey data is taken while drilling the wellbore. In some embodiments, a tortuosity system smooths the survey data by averaging, for each measurement depth, each of the azimuth and inclination based on the azimuth and inclination of measurement depths within a threshold distance of the measurement depth.

In some embodiments, the method 1200 includes an act 1220 of receiving wellbore diameter data indicating a diameter of the wellbore at one or more measurement depths of the wellbore. In some embodiments, the wellbore diameter indicates a wellbore of a constant diameter for the length of the wellbore. In some embodiments, the wellbore diameter indicates a change in the wellbore diameter one or more times through the length of the wellbore.

In some embodiments, the method 1200 includes an act 1230 of, based on the survey data and the wellbore diameter data, and for at least one of the one or more measurement depths, performing one or more additional acts. For example, the method may include an act 1240 of selecting a reference diameter. The reference diameters may include a minimum reference diameter of 0 and/or a maximum reference diameter of 0.025 inches less than a gauge diameter of the wellbore. The method may include an act 1250 of determining a tortuosity length corresponding to a maximum length that a straight tubular having the reference diameter can extend from the measurement depth and down through the wellbore without bending. In some embodiments, the method 1200 includes determining a location to implement one or more downhole tools based on the one or more tortuosity lengths. In some embodiments, the tortuosity system determines a downhole tool fingerprint based on the one or more tortuosity lengths. In some embodiments, the tortuosity system determines the tortuosity length for each measurement depth based on the smoothed survey data. In some embodiments, the tortuosity system determines, for each measurement depth, a plurality of reference diameters and a tortuosity length for each of the plurality of reference diameters at the measurement depth.

In some embodiments, the tortuosity system generates a plot representing the plurality of tortuosity lengths for the plurality of reference diameters for each of the measurement depths. The tortuosity system may present the plot via a graphical user interface of a client device. In some embodiments, the plot represents the inclination and azimuth for each measurement depth. In some embodiments, the method 1200 is performed while drilling the wellbore and in real time.

Figure 13:
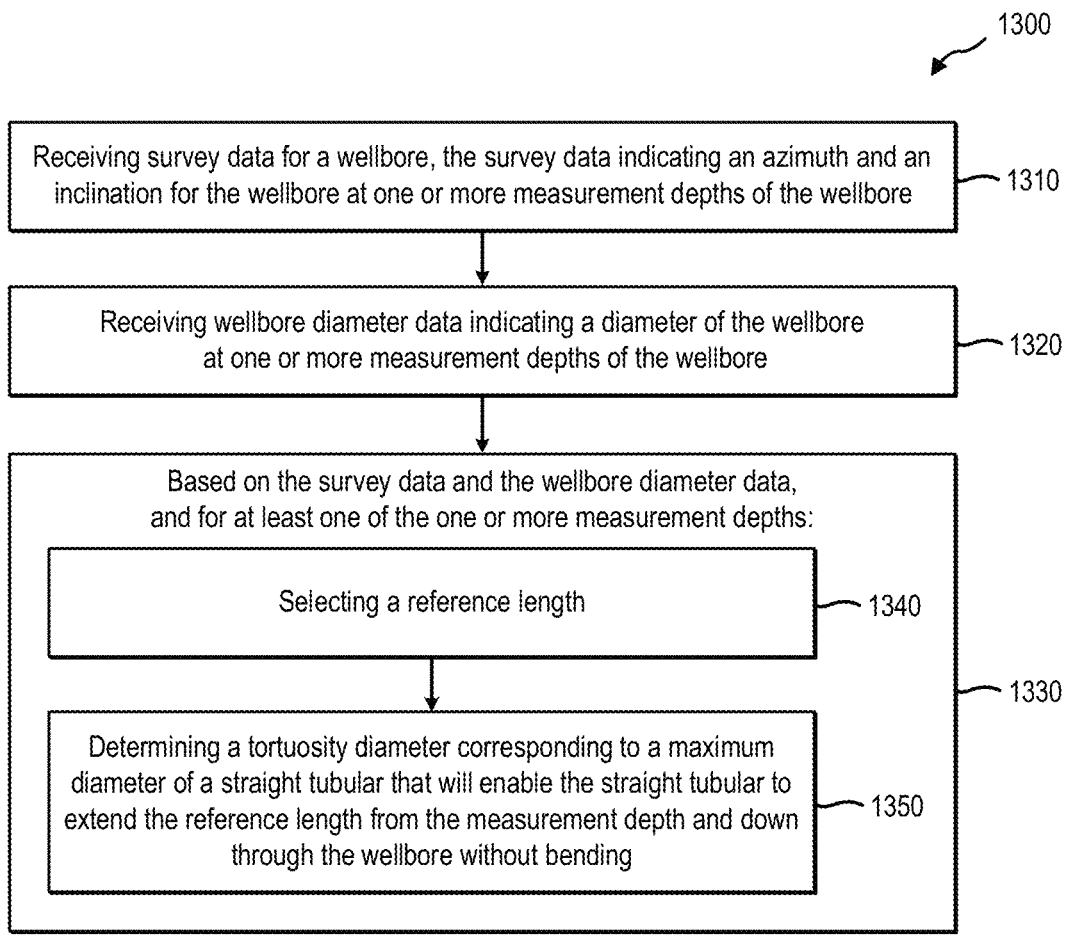
FIG. 13 illustrates a flow diagram for a method or a series of acts for quantifying tortuosity of a wellbore as described herein, according to at least one embodiment of the present disclosure.

FIG. 13 illustrates a flow diagram for a method 1300 or a series of acts for quantifying tortuosity of a wellbore as described herein, according to at least one embodiment of the present disclosure. While FIG. 13 illustrates acts according to one embodiment, alternative embodiments may add to, omit, reorder, or modify any of the acts of FIG. 13.

In some embodiments, the method 1300 includes an act 1310 of receiving survey data for the wellbore. The survey data may indicate an azimuth and inclination for the wellbore at one or more measurement depths of the wellbore.

In some embodiments, the method 1300 includes an act 1320 of receiving wellbore diameter data indicating a diameter of the wellbore at one or more measurement depths of the wellbore.

In some embodiments, the method 1300 includes an act 1330 of, based on the survey data and the wellbore diameter data, and for at least one of the one or more measurement depths, performing one or more additional acts. For example, the method may include an act 1340 of selecting a reference length. The method may include an act 1350 of determining a tortuosity diameter corresponding to a maximum diameter of a straight tubular that will enable the straight tubular to extend from the measurement depth and down through the wellbore without bending. In some embodiments, the tortuosity system selects a plurality of reference lengths, and determines the tortuosity diameter for each of the plurality of reference lengths at the measurement depth. In some embodiments, the tortuosity system generates a plot representing the plurality of tortuosity diameters for the plurality of reference lengths for each measurement depth.

Figure 14:
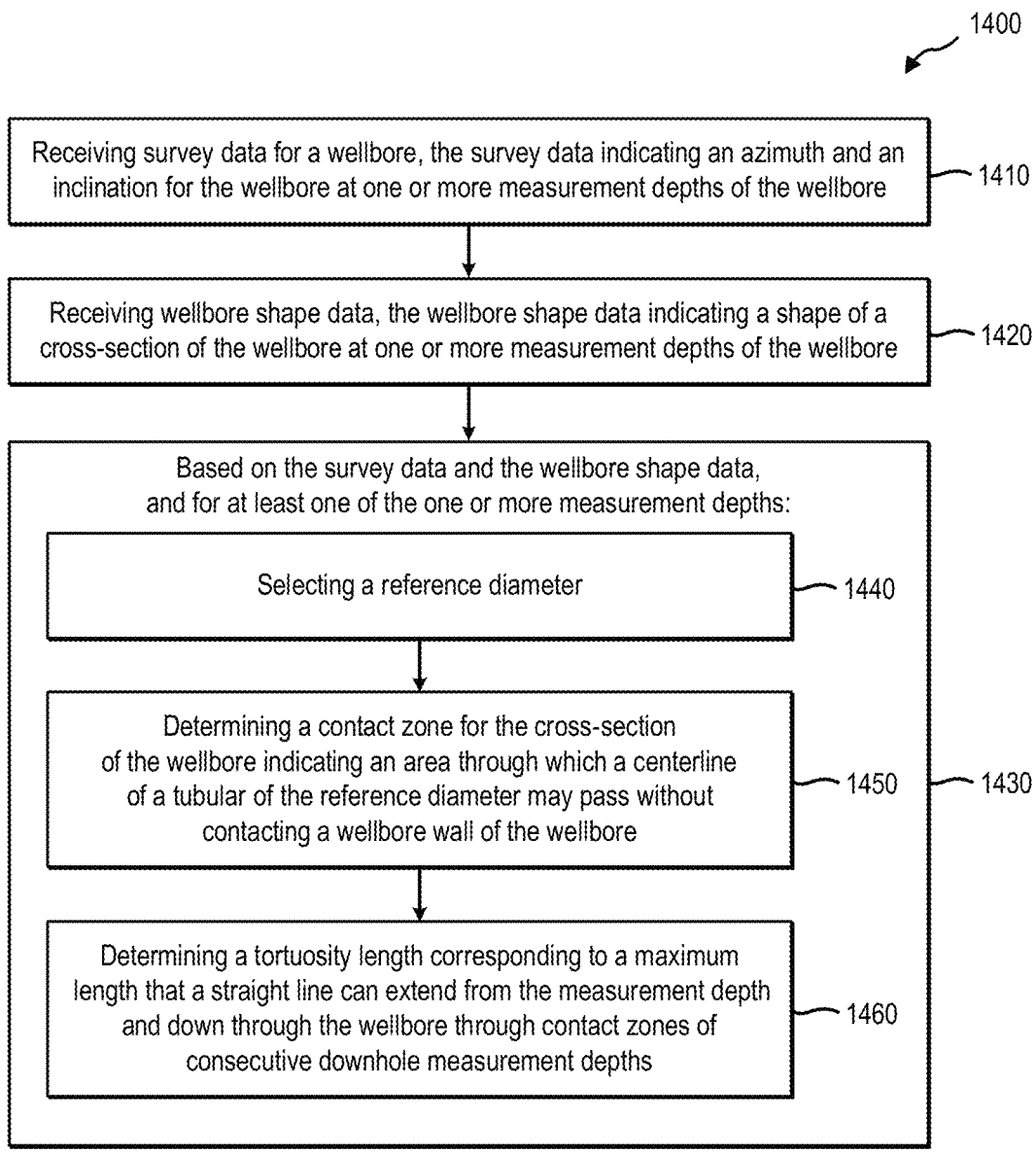
FIG. 14 illustrates a flow diagram for a method or a series of acts for quantifying tortuosity of a wellbore as described herein, according to at least one embodiment of the present disclosure.

FIG. 14 illustrates a flow diagram for a method 1400 or a series of acts for quantifying tortuosity of a wellbore as described herein, according to at least one embodiment of the present disclosure. While FIG. 14 illustrates acts according to one embodiment, alternative embodiments may add to, omit, reorder, or modify any of the acts of FIG. 14.

In some embodiments, the method 1400 includes an act 1410 of receiving survey data for the wellbore. The survey data may indicate an azimuth and inclination for the wellbore at one or more measurement depths of the wellbore.

In some embodiments, the method 1400 includes an act 1420 of receiving wellbore shape data, the wellbore shape data indicating a shape of a cross-section of the wellbore at one or more measurement depths of the wellbore.

In some embodiments, the method 1400 includes an act 1430 of, based on the survey data and the wellbore shape data, and for at least one of the one or more measurement depths, performing one or more additional acts. For example, the method may include an act 1440 of selecting a reference diameter. The method may include an act 1450 of determining a contact zone for the cross-section of the wellbore indicating an area through which a centerline of a tubular of the reference diameter may pass without contacting a wellbore wall of the wellbore. In some embodiments, one or more cross-sections of one or more measurement depths of the wellbore are irregular shapes. In some embodiments, the tortuosity system determines, for each measurement depth, a contact topography including a contact zone for each of a plurality of reference diameters. Determining the contact zone for the cross-section may include selecting the contact zone for the selected reference diameter from the contact topography for each measurement depth. The method may include an act 1460 of determining a tortuosity length corresponding to a maximum length that a straight line can extend from the measurement depth and down through the wellbore through contact zones of consecutive downhole measurement depths.

Figure 15:
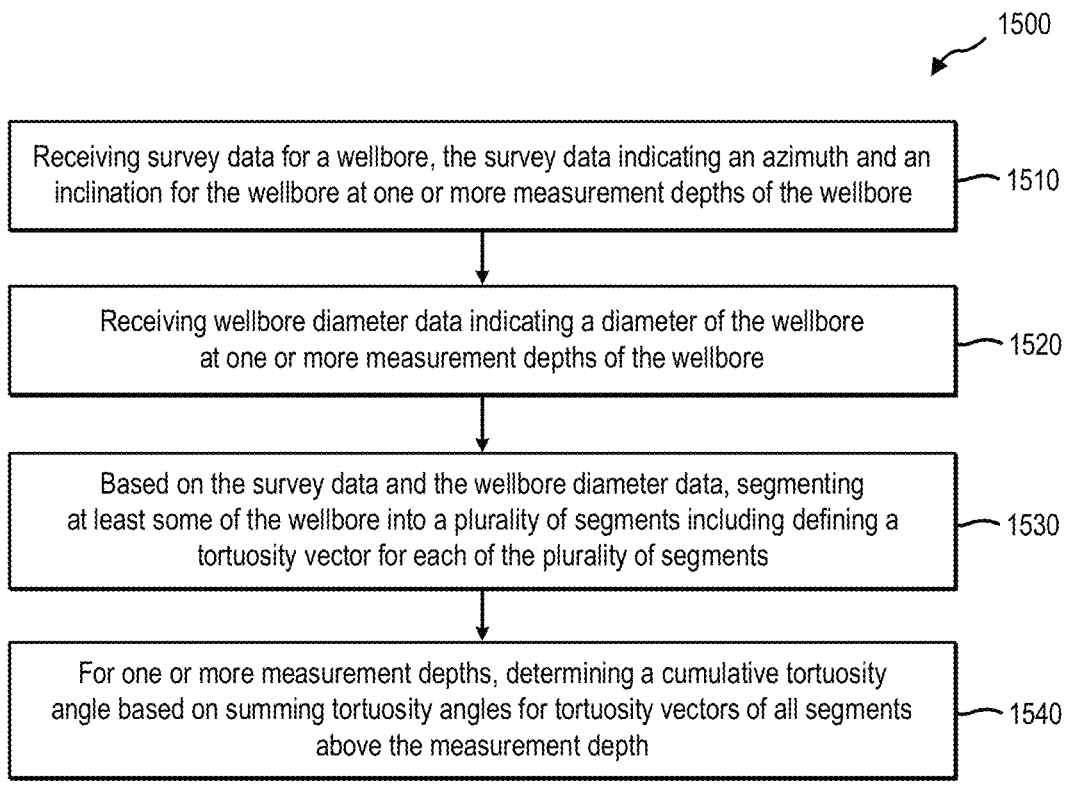
FIG. 15 illustrates a flow diagram for a method or a series of acts for quantifying tortuosity of a wellbore as described herein, according to at least one embodiment of the present disclosure.

FIG. 15 illustrates a flow diagram for a method 1500 or a series of acts for quantifying tortuosity of a wellbore as described herein, according to at least one embodiment of the present disclosure. While FIG. 15 illustrates acts according to one embodiment, alternative embodiments may add to, omit, reorder, or modify any of the acts of FIG. 15.

In some embodiments, the method 1500 includes an act 1510 of receiving survey data for the wellbore. In some embodiments, the survey data is collected while drilling the wellbore. The survey data may indicate an azimuth and inclination for the wellbore at one or more measurement depths of the wellbore.

In some embodiments, the method 1500 includes an act 1520 of receiving wellbore diameter data indicating a diameter of the wellbore at one or more measurement depths of the wellbore.

In some embodiments, the method 1500 includes an act 1530 of, based on the survey data and the wellbore diameter data, segmenting at least some of the wellbore into a plurality of segments including defining a tortuosity vector for each of the plurality of segments. In some embodiments, the tortuosity system defines the tortuosity vector for each segment based on selecting a reference diameter and determining a tortuosity length for the tortuosity vector, the tortuosity length corresponding to a maximum length that a straight tubular having the reference diameter can extend from a previous segment and down through the wellbore without bending. The tortuosity system may also determine a tortuosity angle for the tortuosity vector defined between the straight tubular of the segment and the tortuosity vector of the previous segment.

In some embodiments, the tortuosity system segments the wellbore into one or more additional pluralities of segments associated with one or more additional reference diameters. For each measurement depth, the tortuosity system may determine one or additional cumulative tortuosity angles based on the associated segments of the additional pluralities of segments.

In some embodiments, the method 1500 includes an act 1540 of, for one or more measurement depths, determining a cumulative tortuosity angle based on summing tortuosity angles for tortuosity vectors of all segments above the measurement depth. In some embodiments, the method 1500 includes, based on the determined cumulative tortuosity angle, adjusting one or more drilling parameters of the downhole drilling operation. In some embodiments, the tortuosity system generates a plot representing the cumulative tortuosity angle for each measurement depth. The tortuosity system may present the plot via a graphical user interface of a client device. In some embodiments, the method 1500 is performed while drilling the wellbore and in real time.

Figure 16:
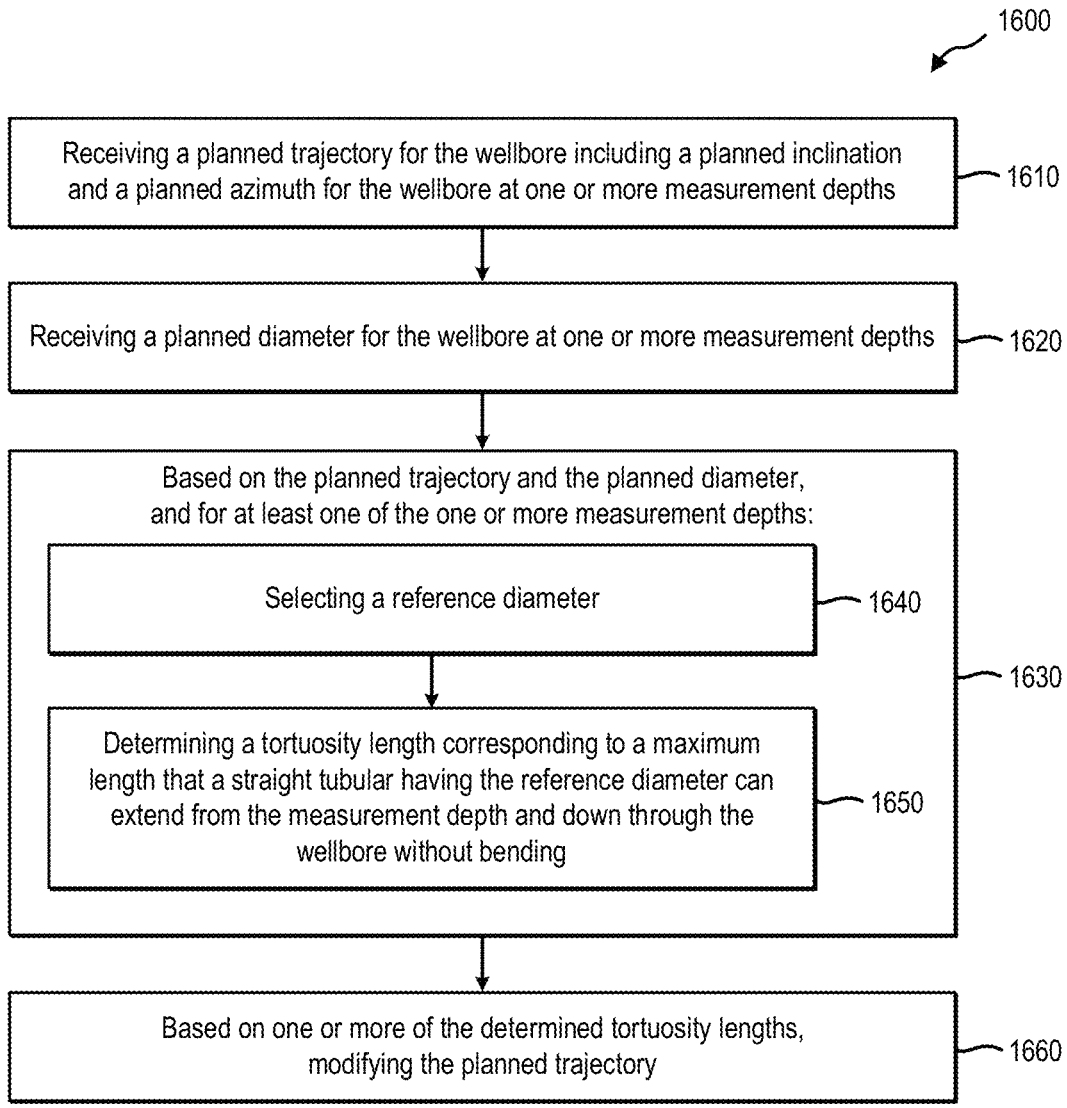
FIG. 16 illustrates a flow diagram for a method or a series of acts for analyzing tortuosity of a wellbore as described herein, according to at least one embodiment of the present disclosure.

FIG. 16 illustrates a flow diagram for a method 1600 or a series of acts for analyzing tortuosity of a wellbore as described herein, according to at least one embodiment of the present disclosure. While FIG. 16 illustrates acts according to one embodiment, alternative embodiments may add to, omit, reorder, or modify any of the acts of FIG. 16.

In some embodiments, the method 1600 includes an act 1610 of receiving a planned trajectory for the wellbore including a planned inclination and a planned azimuth for the wellbore at one or more measurement depths.

In some embodiments, the method 1600 includes an act 1620 of receiving a planned diameter for the wellbore at one or more measurement depths.

In some embodiments, the method 1600 includes an act 1630 of, based on the planned trajectory and the planned diameter and for at least one of the one or more measurement depths, performing one or more additional acts. For example, the method 1600 may include an act 1640 of selecting a reference diameter. The method 1600 may include an act 1650 of determining a tortuosity length corresponding to a maximum length that a straight tubular having the reference diameter can extend from the measurement depth and down through the wellbore without bending.

In some embodiments, the method 1600 includes an act 1660 of, based on one or more of the determined tortuosity lengths, modifying the planned trajectory. For example, the planned trajectory may be modified to maintain one or more of the determined tortuosity lengths above the threshold length. In another example, the planned trajectory may be modified to maintain the determined tortuosity length of a specific measurement depth above a threshold length. The threshold length may be based on one or more downhole tools to be implemented in the wellbore at one or more measurement depths. The threshold length may be based on one or more downhole tools to traverse through the wellbore at one or more measurement depths. In some embodiments, the method 1600 includes determining one or more downhole tools to implement in the wellbore based on the determined tortuosity lengths.

Figure 17:
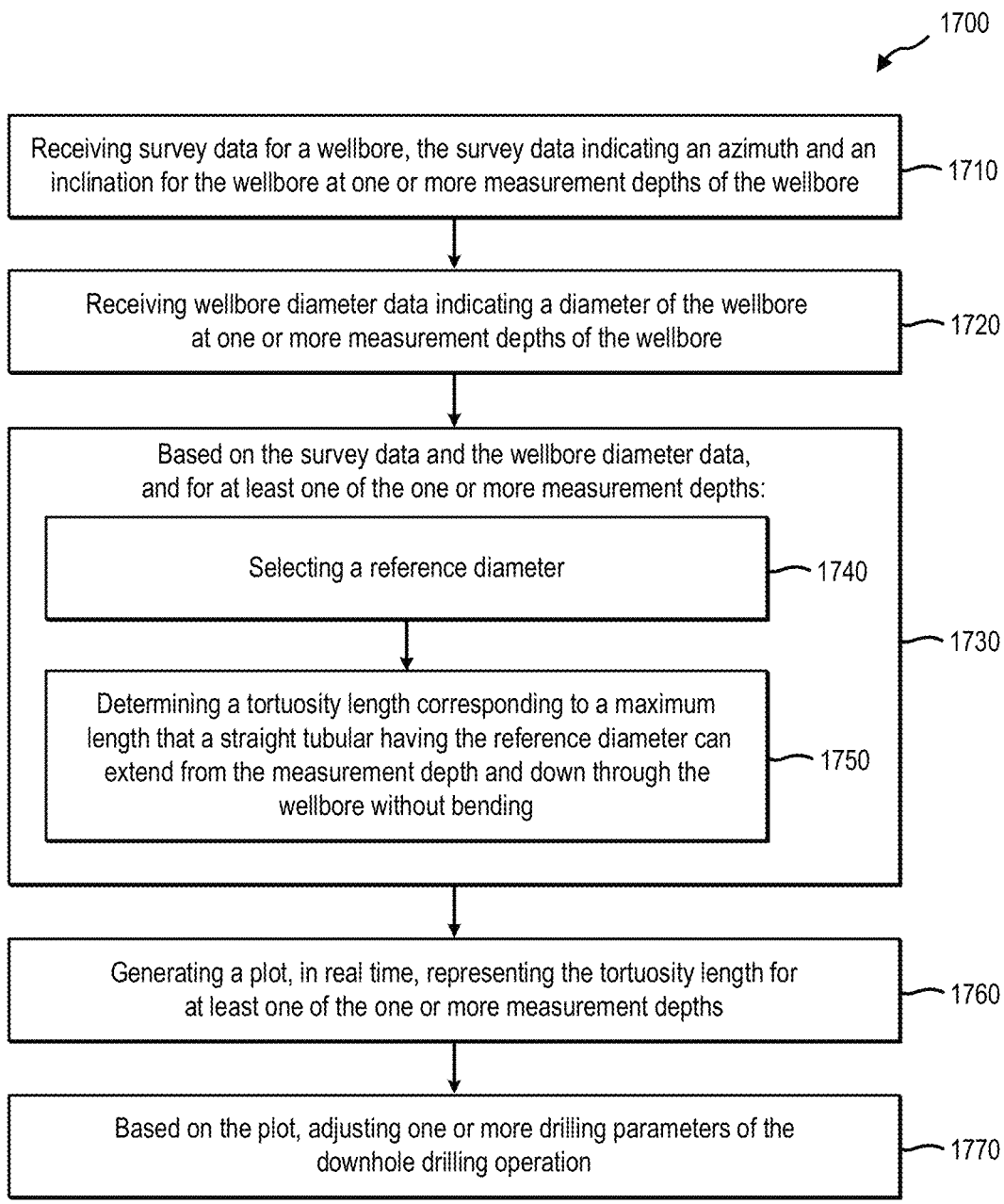
FIG. 17 illustrates a flow diagram for a method or a series of acts for operating a downhole drilling operation of a wellbore as described herein, according to at least one embodiment of the present disclosure.

FIG. 17 illustrates a flow diagram for a method 1700 or a series of acts for operating a downhole drilling operation of a wellbore as described herein, according to at least one embodiment of the present disclosure. While FIG. 17 illustrates acts according to one embodiment, alternative embodiments may add to, omit, reorder, or modify any of the acts of FIG. 17.

In some embodiments, the method 1700 includes an act 1710 of receiving real-time survey data for the wellbore. The survey data may indicate an azimuth and an inclination for the wellbore at one or more measurement depths of the wellbore.

In some embodiments, the method 1700 includes an act 1720 of receiving wellbore diameter data indicating a diameter of the wellbore at one or more measurement depths of the wellbore.

In some embodiments, the method 1700 includes an act 1730 of, based on the survey data and the wellbore diameter data, and for at least one of the one or more measurement depths, performing one or more additional acts. For example, the method may include an act 1740 of selecting a reference diameter. The method may include an act 1750 of determining a tortuosity length corresponding to a maximum length that a straight tubular having the reference diameter can extend from the measurement depth and down through the wellbore without bending. In some embodiments, the tortuosity system, for each measurement depth, selects a plurality of reference diameters and determines, in real time, the tortuosity length associated with each of the plurality of reference diameters at the measurement depth.

In some embodiments, the method 1700 includes an act 1760 of generating a plot, in real time, representing the tortuosity length for at least one of the one or more measurement depths. The plot may represent the tortuosity lengths for each of the plurality of reference diameters at each measurement depth.

In some embodiments, the method 1700 includes an act 1770 of, based on the plot, adjusting one or more drilling parameters of the downhole drilling operation. For example, adjusting one or more drilling parameters may include adjusting a steering of a downhole tool implemented in the wellbore. In another example, adjusting one or more downhole drilling parameters may include adjusting a rate of penetration of a downhole tool implemented in the wellbore. In another example, one or more drilling parameters may be adjusted to maintain an active tortuosity length below a threshold value.

Figure 18:
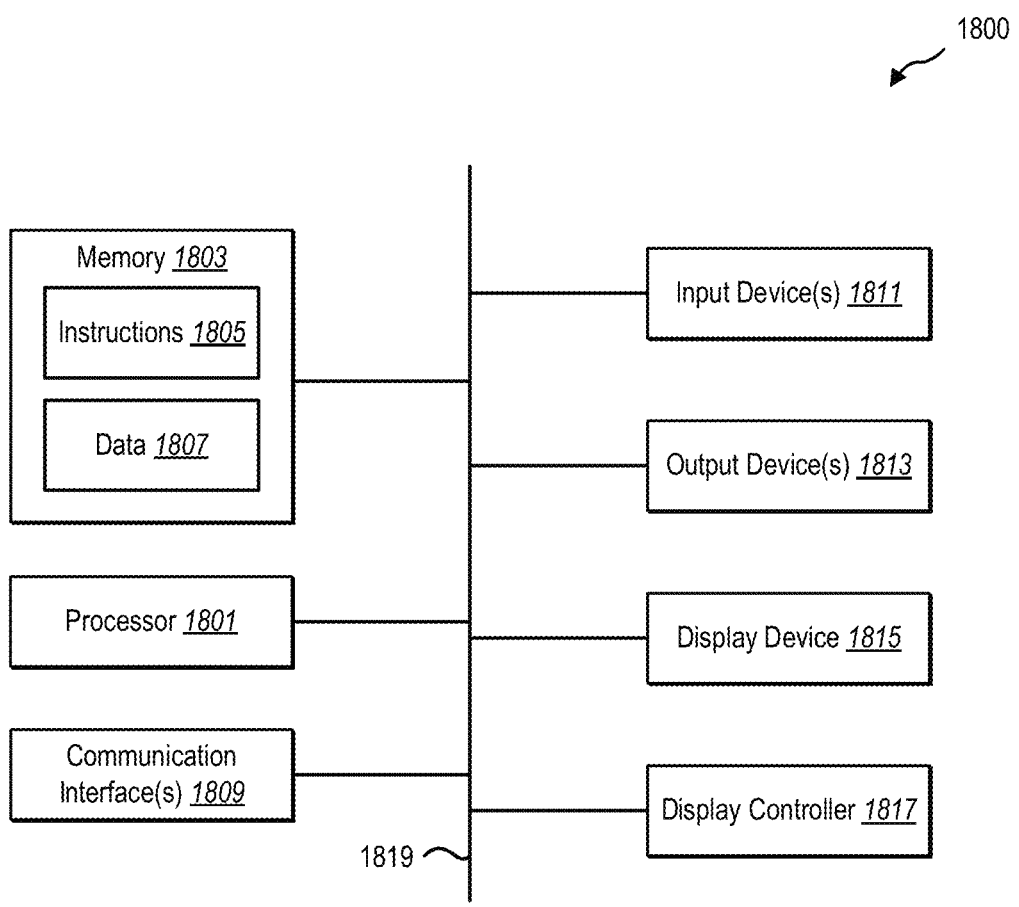
FIG. 18 illustrates certain components that may be included within a computer system 1800, according to at least one embodiment of the present disclosure.

Turning now to FIG. 18, this figure illustrates certain components that may be included within a computer system 1800. One or more computer systems 1800 may be used to implement the various devices, components, and systems described herein.

The computer system 1800 includes a processor 1801. The processor 1801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1801 may be referred to as a central processing unit (CPU). Although just a single processor 1801 is shown in the computer system 1800 of FIG. 18, in an alternative configuration, a combination of processors (e.g., an ARM and DSP) could be used.

The computer system 1800 also includes memory 1803 in electronic communication with the processor 1801. The memory 1803 may include computer-readable storage media and can be any available media that can be accessed by a general purpose or special purpose computer system. Computer-readable media that store computer-executable instructions are non-transitory computer-readable media (device). Computer-readable media that carry computer-executable instructions are transmission media. Thus, by way of example and not limitations, embodiments of the present disclosure can comprise at least two distinctly different kinds of computer-readable media: non-transitory computer-readable media (devices) and transmission media.

Both non-transitory computer-readable media (devices) and transmission media may be used temporarily to store or carry software instructions in the form of computer readable program code that allows performance of embodiments of the present disclosure. Non-transitory computer-readable media may further be used to persistently or permanently store such software instructions. Examples of non-transitory computer-readable storage media include physical memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other non-transmission medium which can be used to store program code in the form of computer-executable instructions or data structures and which can be accessed by a general purpose or special purpose computer, whether such program code is stored or in software, hardware, firmware, or combinations thereof.

Instructions 1805 and data 1807 may be stored in the memory 1803. The instructions 1805 may be executable by the processor 1801 to implement some or all of the functionality disclosed herein. Executing the instructions 1805 may involve the use of the data 1807 that is stored in the memory 1803. Any of the various examples of modules and components described herein may be implemented, partially or wholly, as instructions 1805 stored in memory 1803 and executed by the processor 1801. Any of the various examples of data described herein may be among the data 1807 that is stored in memory 1803 and used during execution of the instructions 1805 by the processor 1801.

A computer system 1800 may also include one or more communication interfaces 1809 for communicating with other electronic devices. The communication interface(s) 1809 may be based on wired communication technology, wireless communication technology, or both. Some examples of communication interfaces 1809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The communication interfaces 1809 may connect the computer system 1800 to a network. A "network" or "communications network" may generally be defined as one or more data links that enable the transport of electronic data between computer systems and/or modules, engines, or other electronic devices, or combinations thereof. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instruction or data structures and which can be accessed by a general purpose or special purpose computer.

A computer system 1800 may also include one or more input devices 1811 and one or more output devices 1813. Some examples of input devices 1811 include a keyboard, mouse, microphone, remote control device, button, joystick, trackball, touchpad, and lightpen. Some examples of output devices 1813 include a speaker and a printer. One specific type of output device that is typically included in a computer system 1800 is a display device 1815. Display devices 1815 used with embodiments disclosed herein may utilize any suitable image projection technology, such as liquid crystal display (LCD), light-emitting diode (LED), gas plasma, electroluminescence, or the like. A display controller 1817 may also be provided, for converting data 1807 stored in the memory 1803 into one or more of text, graphics, or moving images (as appropriate) shown on the display device 1815.

The various components of the computer system 1800 may be coupled together by one or more buses, which may include one or more of a power bus, a control signal bus, a status signal bus, a data bus, other similar components, or combinations thereof. For the sake of clarity, the various buses are illustrated in FIG. 18 as a bus system 1819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Further, upon reaching various computer system components, program code in the form of computer-executable instructions or data structures can be transferred automatically or manually from transmission media to non-transitory computer-readable storage media (or vice versa). For example, computer executable instructions or data structures received over a network or data link can be buffered in memory (e.g., RAM) within a network interface module (NIC), and then eventually transferred to computer system RAM and/or to less volatile non-transitory computer-readable storage media at a computer system. Thus, it should be understood that non-transitory computer-readable storage media can be included in computer system components that also (or even primarily) utilize transmission media.

The embodiments of the tortuosity system have been primarily described with reference to wellbore drilling operations; the tortuosity system described herein may be used in applications other than the drilling of a wellbore. In other embodiments, the tortuosity system according to the present disclosure may be used outside a wellbore or other downhole environment used for the exploration or production of natural resources. For instance, the tortuosity system of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of quantifying tortuosity of a wellbore, the method comprising:
   receiving survey data for the wellbore, the survey data indicating an azimuth and an inclination for the wellbore at one or more measurement depths of the wellbore;
   receiving wellbore diameter data indicating the diameter of the wellbore at the one or more measurement depths of the wellbore;
   based on the survey data and the wellbore diameter data, and for at least one of the one or more measurement depths:
      selecting a reference diameter; and
      determining a tortuosity length corresponding to a maximum length that a straight tubular having the reference diameter can extend from the measurement depth and down through the wellbore without bending;
   for each measurement depth, determining a contact topography for each of a plurality of reference diameters including determining a contact zone for each of the plurality of reference diameters, the determining the contact zone including selecting the contact zone for each of the plurality of reference diameters from the contact topography for each measurement depth;
   comparing the determined tortuosity length to a threshold tortuosity length; and
   adjusting an operation of a downhole tool to reduce a resultant tortuosity when the determined tortuosity length is less than the threshold tortuosity length.

2. The method of claim 1, further comprising, for each measurement depth:
   selecting at least two or more of the plurality of reference diameters; and
   determining the tortuosity length for each of the selected plurality of reference diameters at the measurement depth.

3. The method of claim 2, wherein the plurality of reference diameters includes a minimum reference diameter of 0.

4. The method of claim 2, wherein the plurality of reference diameters includes a maximum reference diameter of 0.025 inches less than a borehole diameter.

5. The method of claim 2, wherein the wellbore diameter data indicates a change in the wellbore diameter one or more times through the length of the wellbore.

6. The method of claim 2, further comprising determining a location to implement one or more downhole tools based on the one or more tortuosity lengths.

7. The method of claim 2, further comprising determining a downhole tool fingerprint based on the one or more tortuosity lengths.

8. The method of claim 2, further comprising generating a plot representing the plurality of tortuosity lengths for the plurality of reference diameters for each of the measurement depths.

9. The method of claim 8, further comprising presenting the plot via a graphical user interface of a client device.

10. The method of claim 8, wherein the plot further represents the inclination and the azimuth for each measurement depth.

11. The method of claim 1, further comprising:
    smoothing the survey data by averaging, for each measurement depth, each of the azimuth and the inclination based on the azimuth and inclination of measurement depths within a threshold distance of the measurement depth; and
    determining the tortuosity length for each measurement depth based on the smoothed survey data.

12. The method of claim 1, wherein the survey data is taken while drilling the wellbore.

13. The method of claim 1, wherein the method is performed while drilling the wellbore and in real time.

14. The method of claim 2, wherein the wellbore diameter data indicates a wellbore of a constant diameter for the length of the wellbore.

15. A method of quantifying tortuosity of a wellbore, the method comprising:
    receiving survey data for the wellbore, the survey data indicating an azimuth and an inclination for the wellbore at one or more measurement depths of the wellbore;
    receiving wellbore diameter data indicating the diameter of the wellbore at the one or more measurement depths of the wellbore;
    based on the survey data and the wellbore diameter data, and for at least one of the one or more measurement depths:
       selecting a reference length; and
       determining a tortuosity diameter corresponding to a maximum diameter of a straight tubular that will enable the straight tubular to extend the reference length from the measurement depth and down through the wellbore without bending;
    for each measurement depth, determining a contact topography for each of a plurality of reference diameters including determining a contact zone for each of the plurality of reference diameters, the determining the contact zone including selecting the contact zone for each of the plurality of reference diameters from the contact topography for each measurement depth;
    comparing the determined tortuosity length to a threshold tortuosity length; and
    adjusting an operation of a downhole tool to reduce a resultant tortuosity when the determined tortuosity length is less than the threshold tortuosity length.

16. The method of claim 15, further comprising, for each measurement depth:
   selecting a plurality of reference lengths; and
   determining the tortuosity diameter for each of the plurality of reference lengths at the measurement depth.

17. The method of claim 16, further comprising generating a plot representing the plurality of tortuosity diameters for the plurality of reference lengths for each of the measurement depth.

18. A method of quantifying tortuosity of a wellbore, the method comprising:
   receiving survey data, the survey data including an indication of an azimuth and an inclination for the wellbore at one or more measurement depths of the wellbore;
   receiving wellbore shape data, the wellbore shape data including an indication of a shape of a cross-section of the wellbore at one or more measurement depths of the wellbore;
   based on the survey data and the wellbore shape data, and for at least one of the one or more measurement depths:
      selecting a reference diameter;
      determining a contact zone for the cross-section of the wellbore indicating an area through which a centerline of a tubular of the reference diameter may pass without contacting a wellbore wall of the wellbore; and
      determining a tortuosity length corresponding to a maximum length that a straight line can extend from the measurement depth and down through the wellbore through contact zones of consecutive downhole measurement depths;
   for each measurement depth, determining a contact topography including a contact zone for each of a plurality of reference diameters, the determining the contact zone for the cross-section including selecting the contact zone for the selected reference diameter from the contact topography for each measurement depth;
   comparing the determined tortuosity length to a threshold tortuosity length; and
   adjusting an operation of a downhole tool to reduce a resultant tortuosity when the determined tortuosity length is less than the threshold tortuosity length.

19. The method of claim 18, wherein one or more cross-sections of one or more measurement depths of the wellbore are irregular shapes.

* * * * *